United States Patent
Saito et al.

(10) Patent No.: US 9,457,818 B2
(45) Date of Patent: Oct. 4, 2016

(54) VIDEO INFORMATION DISTRIBUTING AND DISPLAYING SYSTEM AND VIDEO INFORMATION DISTRIBUTING AND DISPLAYING METHOD

(75) Inventors: Ryota Saito, Tokyo (JP); Kazunari Morimoto, Tokyo (JP); Hiroshi Asaoka, Tokyo (JP); Satoshi Yamazaki, Tokyo (JP); Masahito Chihira, Tokyo (JP); Masao Oki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 425 days.

(21) Appl. No.: 13/881,461
(22) PCT Filed: Nov. 16, 2010
(86) PCT No.: PCT/JP2010/070402
§ 371 (c)(1),
(2), (4) Date: Apr. 25, 2013
(87) PCT Pub. No.: WO2012/066641
PCT Pub. Date: May 24, 2012

(65) Prior Publication Data
US 2013/0283655 A1 Oct. 31, 2013

(51) Int. Cl.
*B61K 13/00* (2006.01)
*H04N 21/414* (2011.01)
(Continued)

(52) U.S. Cl.
CPC .............. *B61K 13/00* (2013.01); *B61L 3/125* (2013.01); *B61L 15/009* (2013.01); *B61L 15/0036* (2013.01); *H04N 21/41415* (2013.01); *H04N 21/41422* (2013.01)

(58) Field of Classification Search
CPC ............... H04N 21/41422; H04N 21/2146; B61L 25/02; B61L 15/009; B61L 3/125; B61L 15/0036; B61K 13/00
See application file for complete search history.

(56) References Cited

U.S. PATENT DOCUMENTS

2007/0182835 A1* 8/2007 Emoto ............ H04N 21/41422
  348/265
2008/0237406 A1* 10/2008 Saito ...................... B61D 49/00
  246/124

(Continued)

FOREIGN PATENT DOCUMENTS

JP   11-005534 A   1/1999
JP   2002-127905 A   5/2002

(Continued)

OTHER PUBLICATIONS

Arnold, M. [michaelarnold13]. The Seoul Subway Simplified. YouTube [online], Aug. 5, 2010 [retrieved Aug. 27, 2015]. Retrieved from the Internet<URL: https://www.youtube.com/watch?v=k5Mjrod-83s> [timestamps 4:19-4:45].*

(Continued)

*Primary Examiner* — Pankaj Kumar
*Assistant Examiner* — Alexander Boyd
(74) *Attorney, Agent, or Firm* — Buchanan Ingersoll & Rooney PC

(57) ABSTRACT

A screen creating unit selects component contents for displaying a station name array, in which a plurality of station names on a route are arrayed in order of arrival, from a component-content storing unit, moves, according to component arrangement definition data and component motion definition data, the component contents little by little in an array direction from a state in which only a part of station names on a starting station side among the station names are arranged in a scroll display region to a state in which only a part of station names on a terminal station side are arranged, and creates an image of only a portion in the scroll display region without creating the image of a portion outside the scroll display region among the component contents to thereby create a plurality of frames continuous in time series.

15 Claims, 24 Drawing Sheets

(51) Int. Cl.
  *B61L 3/12*   (2006.01)
  *B61L 15/00*  (2006.01)

(56) References Cited

U.S. PATENT DOCUMENTS

2008/0295138 A1\* 11/2008 Emoto ............. H04N 21/41422
                                                     725/75
2009/0010553 A1\*  1/2009 Sagawa .................. H04N 19/52
                                                    382/236
2009/0122001 A1\*  5/2009 Cheung ................ G09G 3/2085
                                                    345/102
2010/0201719 A1\*  8/2010 Kimura ..................... G06T 1/00
                                                    345/690

FOREIGN PATENT DOCUMENTS

| | | |
|---|---|---|
| JP | 2003-095105 A | 4/2003 |
| JP | 2003-106846 A | 4/2003 |
| JP | 2003-317187 A | 11/2003 |
| JP | 2004-070254 A | 3/2004 |
| JP | 2004-203338 A | 7/2004 |
| JP | 2005-275233 A | 10/2005 |
| JP | 3875950 B2 | 1/2007 |
| JP | 3146877 U | 12/2008 |
| JP | 2010-034852 A | 2/2010 |
| JP | 2010-052581 A | 3/2010 |
| JP | 2010-247739 A | 11/2010 |
| JP | 4612118 B1 | 1/2011 |

OTHER PUBLICATIONS

International Search Report (PCT/ISA/210) issued on Dec. 28, 2010, by the Japanese Patent Office as the International Searching Authority for International Application No. PCT/JP2010/070402.
Written Opinion (PCT/ISA/237) issued on Dec. 16, 2010, by the Japanese Patent Office as the International Searching Authority for International Application No. PCT/JP2010/070402.
Office Action of Japanese Application No. 2011-506511 dated Mar. 29, 2011, with English translation.
\*International Search Report (PCT/ISA/210) issued on Dec. 28, 2010, by the Japanese Patent Office as the International Searching Authority for International Application No. PCT/JP2010/070402.
\*Written Opinion (PCT/ISA/237) issued on Dec. 16, 2010, by the Japanese Patent Office as the International Searching Authority for International Application No. PCT/JP2010/070402.
\*Office Action of Japanese Application No. 2011-506511 dated Mar. 29, 2011, with English translation.

\* cited by examiner

FIG. 5
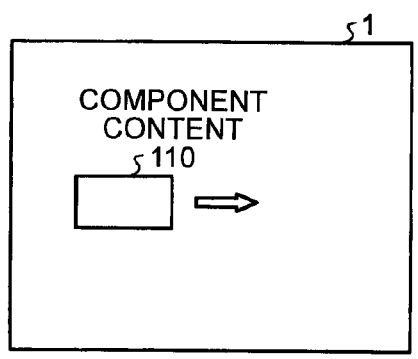
(a)
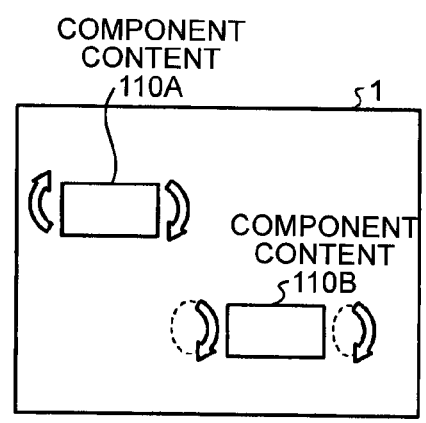
(b)
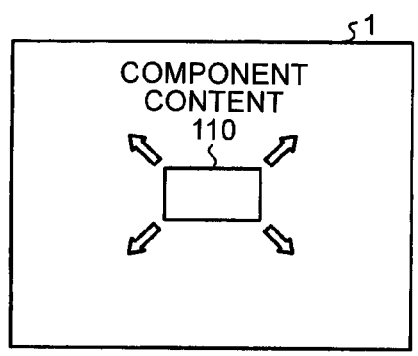
(c)
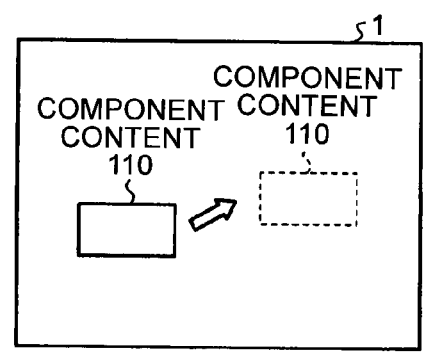
(d)

FIG.14
FIG.15
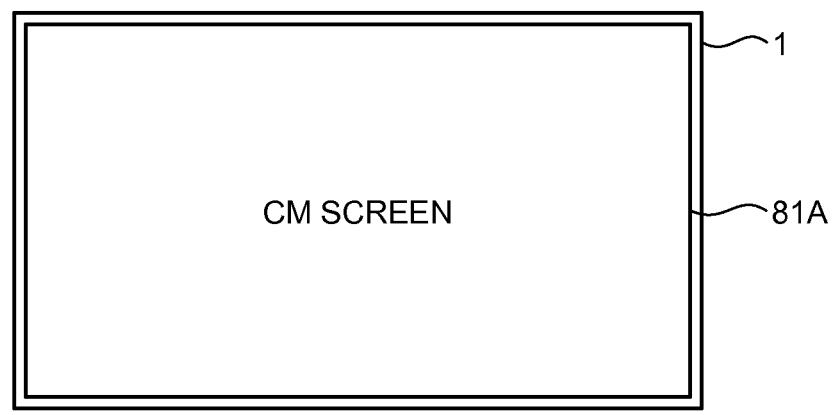
(a)
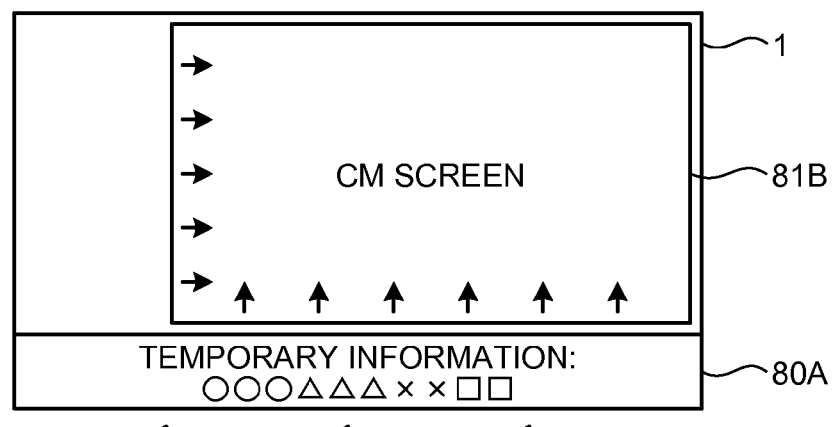
(b)

FIG.17
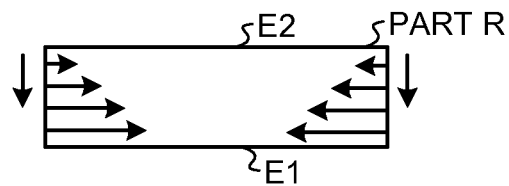
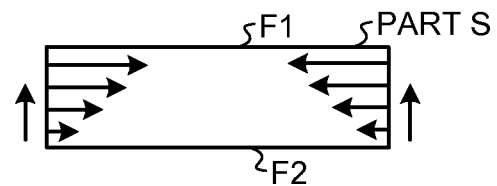
FIG.18

FIG.20
(a)
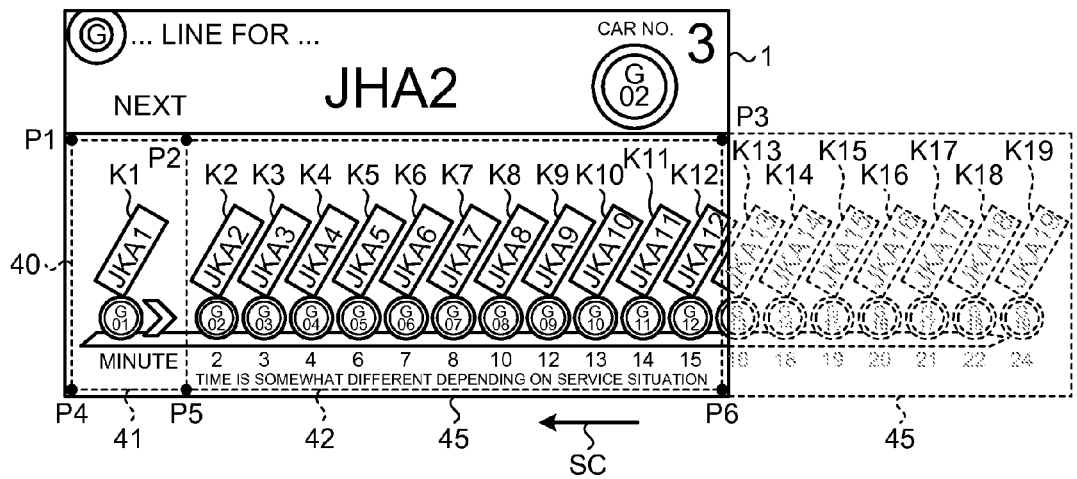
(b)
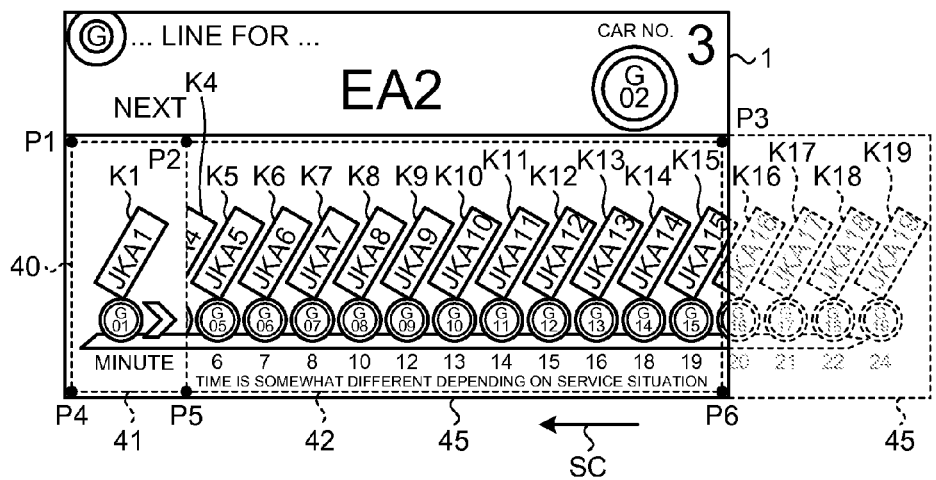
(c)
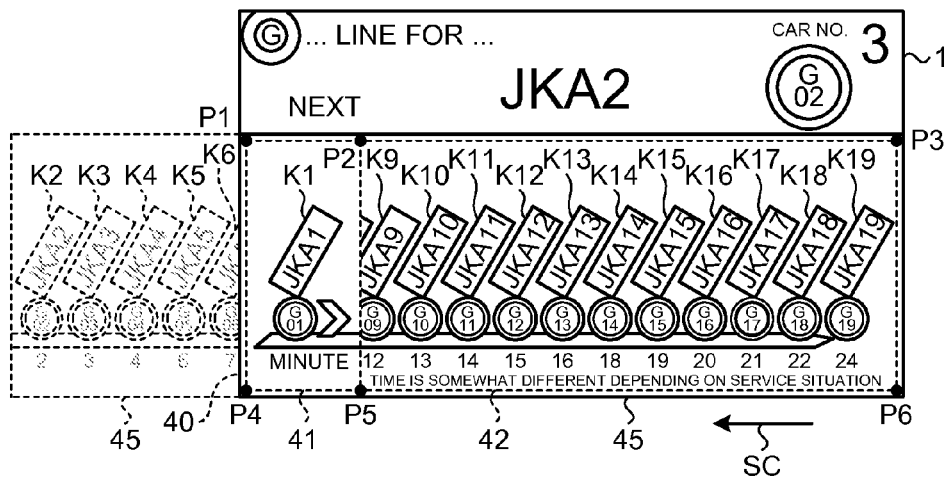

FIG.31
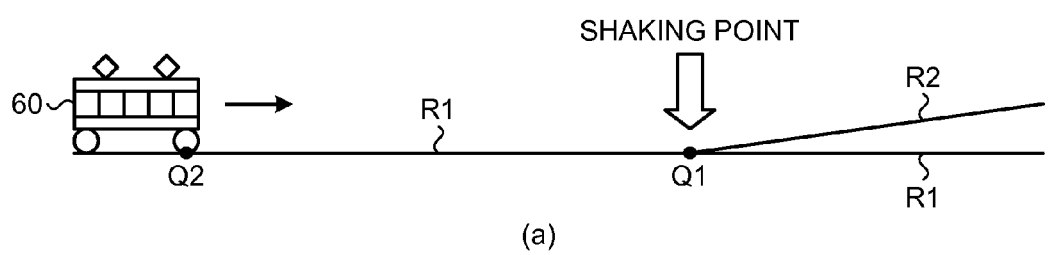
(a)
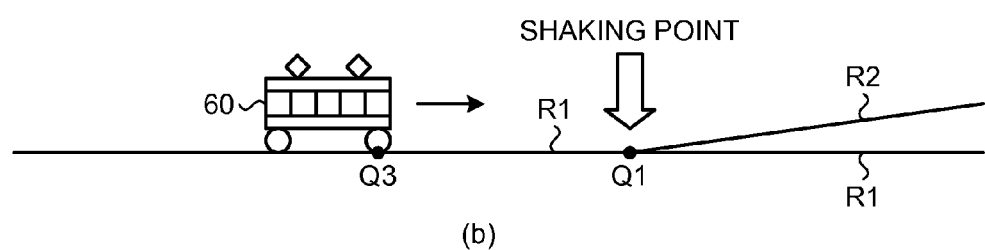
(b)

FIG.32
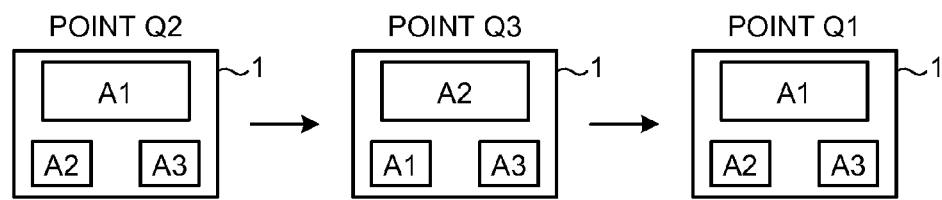
FIG.33
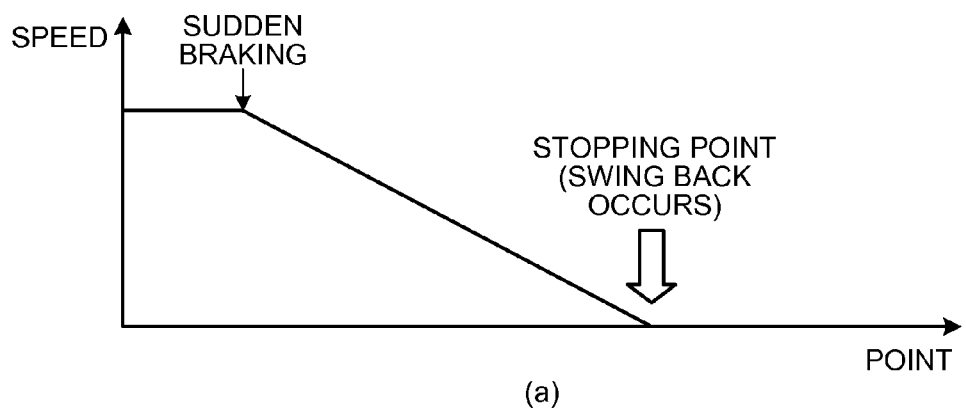
(a)
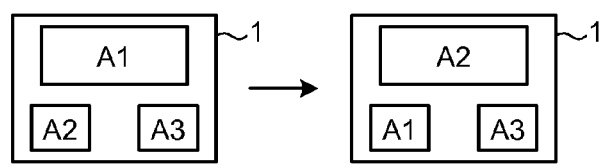
(b)

VIDEO INFORMATION DISTRIBUTING AND DISPLAYING SYSTEM AND VIDEO INFORMATION DISTRIBUTING AND DISPLAYING METHOD

FIELD

The present invention relates to a video information distributing and displaying system and a video information distributing and displaying method for distributing and presenting video information using display devices set in cars of a train.

BACKGROUND

Recently, systems for distributing and providing video information to passengers using display devices set in cars of a train have been proposed and put to practical use (see, for example, Patent Literatures 1 and 2).

In these video information distributing and displaying systems in the past, contents that form guidance screens for destination guidance and the like (hereinafter referred to as "guidance contents") are stored in storing units of the display devices in advance as one content for each of screens.

As explained above, in the video information distributing and displaying systems in the past, one guidance content is displayed for each of the screens stored in the storing units. Therefore, even if only a part of train information such as train types, destinations, car numbers, or the like is different and the other parts of the train information are the same, it is necessary to create one guidance content anew and store the one guidance content in the storing units. Therefore, there is a problem in that a data storage capacity increases according to the number of guidance contents.

Further, in the video information distributing and displaying systems in the past, to cope with, for example, an addition of a station, even if there are common parts such as train types, destinations, car numbers, and the like, it is necessary to create all guidance contents anew. Therefore, there is a problem in that guidance contents increase. Furthermore, when it is desired to add, for example, date information, date information data has to be added to all the guidance contents. Therefore, there is a problem in that a lot of time and labor are necessary.

As measures against these problems, Patent Literature 3 discloses a system including a display device that displays a guidance screen of a still image corresponding to train information. In the system, a storing unit that stores component contents, which are contents at a component level, corresponding to each kind of information forming the guidance screen is provided. Necessary component contents are selected from the storing unit according to train information. A guidance screen is formed by arranging the selected component contents in predetermined positions on the guidance screen. Consequently, it is possible to reduce a data storage capacity and easily cope with addition and correction of guidance contents.

CITATION LIST

Patent Literature

Patent Literature 1: Japanese Patent Application Laid-Open No. 2002-127905
Patent Literature 2: Japanese Patent Application Laid-Open No. 2003-95105
Patent Literature 3: Japanese Patent No. 3875950

SUMMARY

Technical Problem

However, in the system described in Patent Literature 3, because the guidance screen is the still image, there is a problem in that, in general, an amount of information provided to passengers and a degree of attention to the information are small compared with those in the case of a moving image. On the other hand, it is also conceivable to display, for example, a guidance screen of a moving image in display devices in a train. However, in the system in the past, there is a problem in that an enormous data storage capacity is necessary for the display of the moving image.

The present invention has been devised in view of the above and it is an object of the present invention to provide a video information distributing and displaying system and a video information distributing and displaying method that can increase an amount of information provided to passengers and a degree of attention to the information while substantially reducing a data storage capacity necessary for display of guidance contents and can easily cope with addition and correction of display contents.

Solution to Problem

In order to solve above-mentioned problems and achieve the object, a video information distributing and displaying system according to the present invention includes: train information devices respectively mounted on cars included in a train and configured to manage train information in association with one another; display devices respectively mounted on the cars and including display units configured to display a guidance screen; a component-content storing unit configured to store component contents, which are contents at a component level, used for forming the guidance screen; a component-arrangement-definition-data storing unit configured to store component arrangement definition data for defining arrangement of the component contents on the guidance screen; a component-motion-definition-data storing unit configured to store component motion definition data for individually defining motions of the component contents themselves on the guidance screen; and a screen creating unit configured to select, according to guidance contents displayed on the guidance screen, based on the train information obtained from the train information devices, the component contents, which are used for forming the guidance screen, from the component-content storing unit, arrange the selected component contents on the guidance screen according to the component arrangement definition data, sequentially create, for each of a plurality of frames continuous in time series obtained by changing the arranged component contents on the guidance screen little by little according to the component motion definition data, image files used as a base for creating the frames, and display the frames based on the image files in time series on the display unit, wherein the screen creating unit selects, according to the guidance contents displayed on the guidance screen, based on the train information, the component contents, which are used for forming the guidance screen, from the component-content storing unit and moves, according to the component arrangement definition data and the component motion definition data, the component contents little by little from the other end side to one end side of the component contents from a state in which only a part including one end on the one end side of the component contents is arranged and displayed on the guidance screen to a state in which only a part including the other end on the other end side of the component contents is arranged and displayed to thereby create the frames continuous in time series, causes the display unit to display the frames, and smoothly scroll-displays the frames.

Advantageous Effects of Invention

According to the present invention, the component contents are moved and the guidance screen that is seen smoothly moving like an animation moving image is formed. Therefore, it is possible to reduce a data storage capacity necessary for a display, and according to the present invention, it is possible to increase an amount of information provided to passengers and a degree of attention to the information.

According to the present invention, the guidance screen is formed by the component contents and the arrangement and the motions of the component contents are defined by a component arrangement definition data and the component motion definition data. Therefore, it is possible to easily cope with addition and correction of display contents.

Further, according to the present invention, all of a plurality of station names on a route are not simultaneously displayed in one screen and the array of station names are displayed while being scrolled. Therefore, it is possible to display all the station names without reducing a character size.

BRIEF DESCRIPTION OF DRAWINGS

FIG. 5 is a diagram of a motion example of component contents.

FIG. 14 is a diagram of an example of a component content formed as character rendering images.

FIG. 15 is a diagram of a display example of CM guidance according to the second embodiment.

FIG. 17 is a diagram of an example of component contents.

FIG. 18 is a schematic diagram of reducing directions of a part R and a part S.

FIG. 20 is a diagram for explaining scroll display of the route guidance.

FIG. 31 is a diagram for explaining a motion of shaking guidance according to a fifth embodiment.

FIG. 32 is a diagram of an example in which control such as expansion and reduction for the shaking guidance is performed according to kilometrage.

FIG. 33 is a diagram for explaining sudden stop guidance according to a sixth embodiment.

DESCRIPTION OF EMBODIMENTS

A video information distributing and displaying system and a video information distributing and displaying method according to embodiments of the present invention are explained in detail below based on the drawings. The present invention is not limited by the embodiments. First to third embodiments (excluding contents corresponding to FIG. 15(*b*) of a second embodiment, etc.) are based on the description of Japanese Patent Application No. 2010-508639 filed in Japanese Patent Office by the applicant.

First Embodiment.

Figure 1:
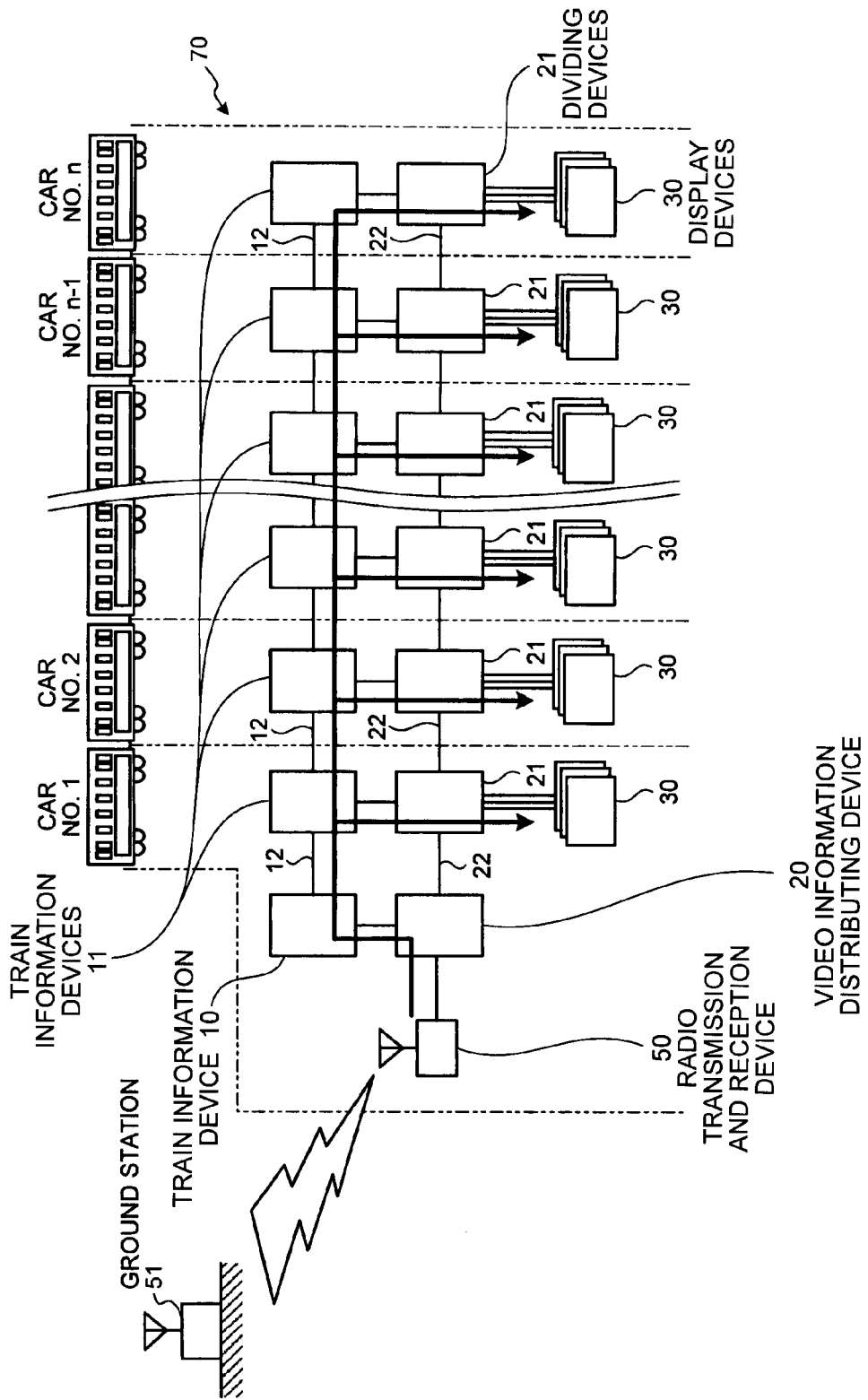
FIG. 1 is a diagram of an overall configuration of a video information distributing and displaying system according to a first embodiment.

FIG. 1 is a diagram of an overall configuration of a video information distributing and displaying system according to a first embodiment. The video information distributing and displaying system according to this embodiment is configured by, for example, an on-board system 70 built on a train including a plurality of cars (a car No. 1 to a car No. n; n is an integer equal to or larger than 2) and a ground station 51 functioning as a ground system. The on-board system 70 includes train information devices 10 and 11, a video information distributing device 20, dividing devices 21, display devices 30, and a radio transmission and reception device 50. The on-board system 70 can perform transmission and reception of data between the on-board system 70 and the ground station 51 using the radio transmission and reception device 50.

The train information device 10 is a train information central device mounted on, for example, a first car (the car No. 1). The train information devices 11 are respectively train information terminal devices amounted on the cars. The train information devices 10 and 11 are connected to one another via a transmission line 12. The train information devices 10 and 11 perform management, collection, and the like of train information in association with one another and share the train information. The train information device 10 is connected to various control devices to manage the train information devices 11. Examples of the train information managed by the train information devices 10 and 11 include stop station information, train type information, car number information, train name information, traveling location information, speed information, and door opening and closing information. These kinds of train information can be notified from the video information distributing device 20 to the dividing devices 21 via a transmission line 22.

The video information distributing device 20 is mounted on, for example, the first car. The video information distributing device 20 performs distribution of stored video information according to necessity. The video information distributing device 20 is connected to each of the train information device 10 and the radio transmission and reception device 50 in the same car. Further, the video information distributing device 20 is connected to the dividing devices 21 respectively mounted on the cars via a transmission line 22. The dividing devices 21 are respectively connected to, for example, a plurality of display devices 30. That is, in the cars, for example, the display devices 30 are respectively mounted on interior wall surfaces of lintel portions around doors, lintel portions around windows or around seats (seat backs, armrests, etc.), or the like.

Service information and the like of a route are transmitted from the ground station 51 to the on-board system 70. The transmitted service information and the like of the route are received by the radio transmission and reception device 50. The received service information and the like of the route are transmitted to the train information device 10 through the video information distributing device 20 and further transmitted to the train information devices 11 mounted on the cars via the transmission line 12. Service information (e.g., a destination, a train type, and a starting station) of the train is input and set in the train information device 10 during service start. The service information input and set during the service start is transmitted to the train information devices 11 of the cars via the transmission line 12. The train information collected by the train information devices 11 of the cars is transmitted and received among the train information devices 11 via the transmission line 12. The train information is shared by the train information devices 11 and the train information device 10. The train information devices 11 of the cars respectively transmit the train information to the display devices 30 via the dividing devices 21. The service information can be notified from the video information distributing device 20 to the dividing devices 21 via the transmission line 22.

The video information distributing device 20 acquires video information (information including a "still image" and a "moving image" (advertisement contents, etc.)) from the ground station 51 using the radio transmission and reception device 50. The video information is, for example, component content data explained below. The video information distributing device 20 transmits the received video information to the display devices mounted on the cars through, for example, a path same as the path for distribution of the train information, i.e., through the train information device 10, the train information devices 11, and the dividing devices 21. Instead of acquiring the video information from the ground station 51, it is also possible to directly input the video information to the video information distributing device 20 using a storage medium, a notebook PC, or the like (not shown in the figure). A transmission path for the video information from the video information distributing device 20 to the display device 30 can be, besides the transmission path explained above, a path directly reaching the display devices 30 through the dividing devices 21, but not through the train information devices 10 and 11. At this point, the dividing devices 21 cause a signal flowing through the transmission line 22 to branch to the display devices 30 provided in the cars. In this way, the train information can be notified from the video information distributing device 20 to the dividing devices 21 via the transmission line 22.

Figure 2:
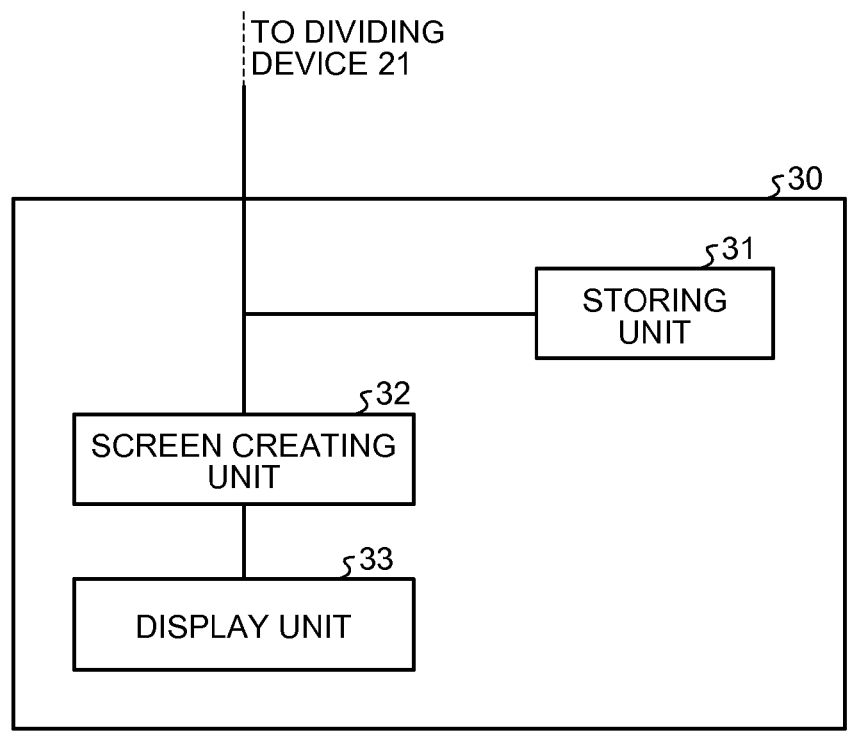
FIG. 2 is a block diagram of the configuration of a display device.

FIG. 2 is a block diagram of the configuration of the display device 30. The display device 30 includes a storing unit 31 such as a memory configured to store various definition data, component content data, and the like explained below, a screen creating unit 32 connected to the storing unit 31 and configured to create a guidance screen for video information, and a display unit 33 configured to display the guidance screen created by the screen creating unit 32. The screen creating unit 32 is realized by hardware such as a CPU and predetermined software that cooperates with the hardware.

Figure 3:
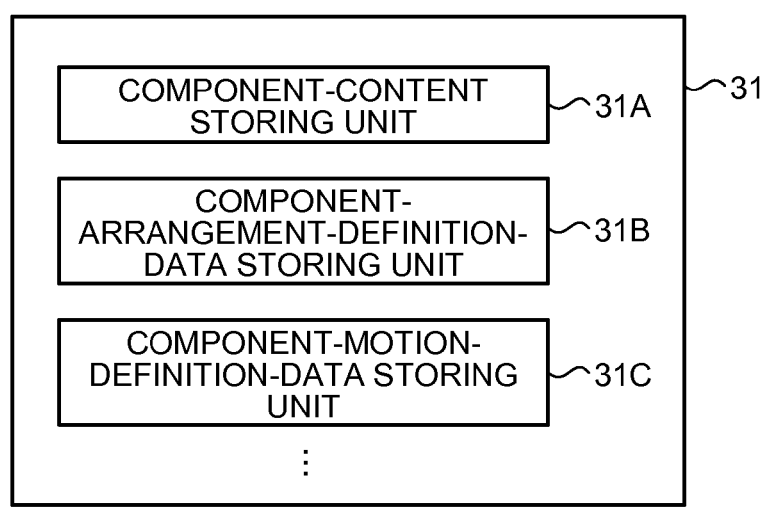
FIG. 3 is a diagram of an example of stored contents of a storing unit.

FIG. 3 is a diagram of an example of stored contents of the storing unit 31. As shown in FIG. 3, the storing unit 31 includes a component-content storing unit 31A configured to store component contents, which is contents in a component level, used for formation of a guidance screen, a component-arrangement-definition-data storing unit 31B configured to store component arrangement definition data for defining arrangement positions of the component contents on the guidance screen, and a component-motion-definition-data storing unit 31C configured to store component motion definition data for defining motions of the component contents on the guidance screen. As explained below, the component contents are images (data) serving as components. The component arrangement definition data is described in, for example, a text format in a component arrangement definition data file. The component motion definition data is described in, for example, a text format in a component motion definition data file. In FIG. 3, storage regions in the display device 30 are collectively shown as the storing unit 31. Therefore, this does not indicate that all of the component-content storing unit 31A, the component-arrangement-definition-data storing unit 31B, and the component-motion-definition-data storing unit 31C are stored in the same storage medium. The storing units can be stored in, for example, separate storage media.

Figure 4:
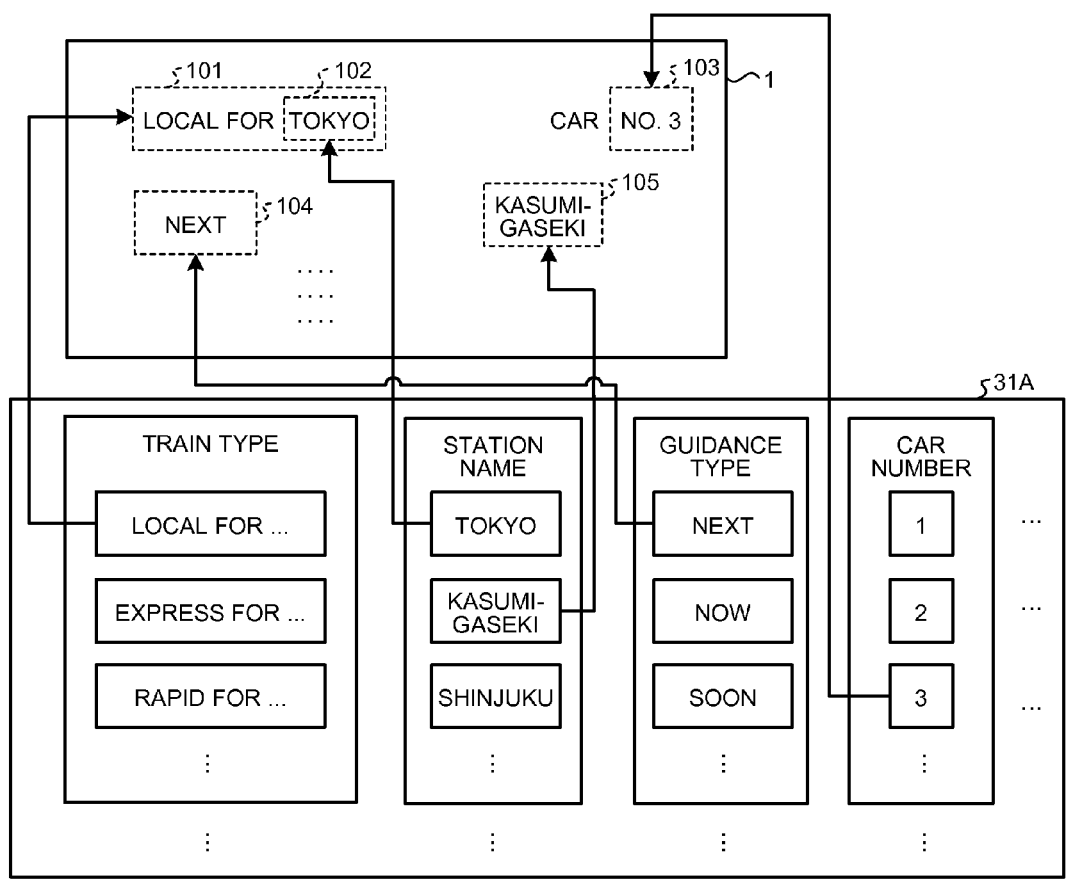
FIG. 4 is a diagram of an example of the configuration of a guidance screen.

An overview of guidance screen creation processing by the screen creating unit 32 is explained. Details of an operation are explained below. First, in this embodiment, as in the case of the still image described in Patent Literature 3, a guidance screen is formed by assembling parts (components). For example, as shown in FIG. 4, when kinds of information concerning a train type 101, a destination 102, a car number 103, a guidance type 104, and a station name 105 are displayed on a guidance screen 1, these kinds of information are respectively formed as parts (components). After acquiring train information from the train information device 11, the screen creating unit 32 selects a component content corresponding to the acquired train information from the component-content storing unit 31A for each of parts. For example, when it is determined based on the train information that a train type is a "local train", the screen creating unit 32 selects "local train for . . . " as a component content that should be used for display of the train type 101. The same holds true concerning the other components. The screen creating unit 32 selects component contents corresponding to the train information. A component content group stored in the component-content storing unit 31A is image data of a still image. The component content group is distributed from the video information distributing device 20.

Subsequently, the screen creating unit 32 arranges, referring to the component arrangement definition data stored in the component-arrangement-definition-data storing unit 31B, the component contents (the train type 101, the destination 102, the car number 103, the guidance type 104, the station name 105, etc.) respectively in predetermined positions on the guidance screen 1. That is, the screen creating unit 32 forms the guidance screen 1 by pasting the selected component contents to the guidance screen 1 and assembling the component contents. The guidance screen 1 formed in this way is an initial screen (a first frame) that forms the guidance contents.

The component contents have a small data volume compared with one guidance screen. The component contents can be diverted to various guidance contents. Therefore, it is possible to reduce a data storage capacity of the entire system by using such component contents.

In this embodiment, not only portions whose display contents change depending on train information (e.g., the train type 101 shown in FIG. 4) but also portions whose display contents do not depend on the train information (e.g., a base portion) can be formed as parts. When at least one part is defined, the remaining portions of the guidance screen 1 can also be regarded as parts. For example, when assuming a configuration in which the train type 101, the destination 102, the car number 103, the guidance type 104, the station name 105, and the like shown in FIG. 4 are pasted to the base portion having a uniform background color, the base portion can also be regarded as a part. Because the portions whose display contents do not depend on the train information are also formed as components, such components can also be sometimes shared among different guidance contents. This contributes to a reduction in a content storage volume of the entire system. For example, it is effective to form a map portion used for a plane route map as a part because the part can be shared.

Subsequently, the screen creating unit 32 refers to the component motion definition data stored in the component-motion-definition-data storing unit 31C. The component motion definition data defines motions of the component contents on the guidance screen 1. Examples of the motions of the component contents include a moving motion, a rotating motion, an expanding or reducing motion, and an appearing or disappearing motion. The appearing or disappearing motion represents a change of a degree of transparency of the component contents that changes temporally and gradually appears from a transparent state or gradually shifts to the transparent state. A change in a color (a change in a hue, a tint, brightness, or the like) can also be included in this motion. Besides, various motions can be defined.

FIG. 5 is a diagram of a motion example of a component content 110. In FIG. 5(a), a motion in which the component content 110 translates in one direction is shown. An arrow indicates the moving direction. In FIG. 5(b), a motion in which a component content 110A rotates clockwise in the guidance screen 1 is shown. A motion in which a display content of a component content 110B rotates in a direction of an arrow around a horizontal axis parallel to the guidance screen 1 is shown. In this case, although an arrangement position of the component content 110B does not change, the display content of the component content 110B rotates. In FIG. 5(c), a motion in which the component content 110 is expanded is shown. In FIG. 5(d), a motion in which the component content 110 translates in a direction of an arrow, a degree of transparency of the component content 110 increases as time elapses, and the component content 110 is gradually made transparent is shown.

Subsequently, the screen creating unit 32 sequentially creates the guidance screen 1 in which the component contents are moved according to the component motion definition data and performs display of guidance contents by causing the display unit 33 to display on the guidance screen 1. As explained in detail below, a screen in which the component contents are slightly moved with respect to an initial screen is created and a screen in which the component contents are slightly moved with respect to the created screen is created. In this way, a plurality of screens in which the component contents are moved according to the component motion definition data are sequentially created. These screens are displayed in time series to perform display of the guidance contents.

Figure 6:
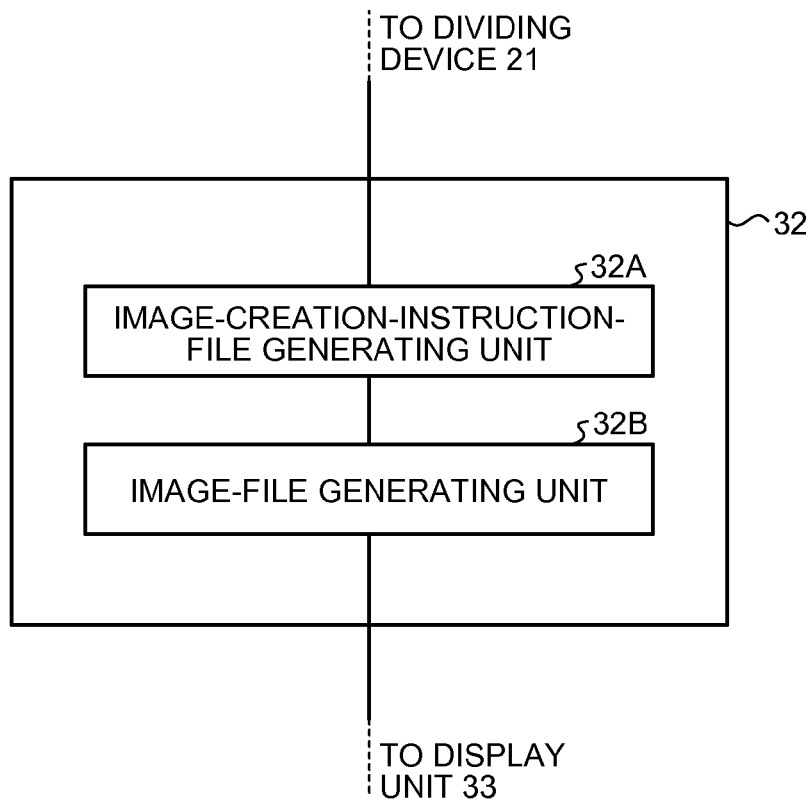
FIG. 6 is a diagram of a functional configuration of a screen creating unit.
Figure 7:
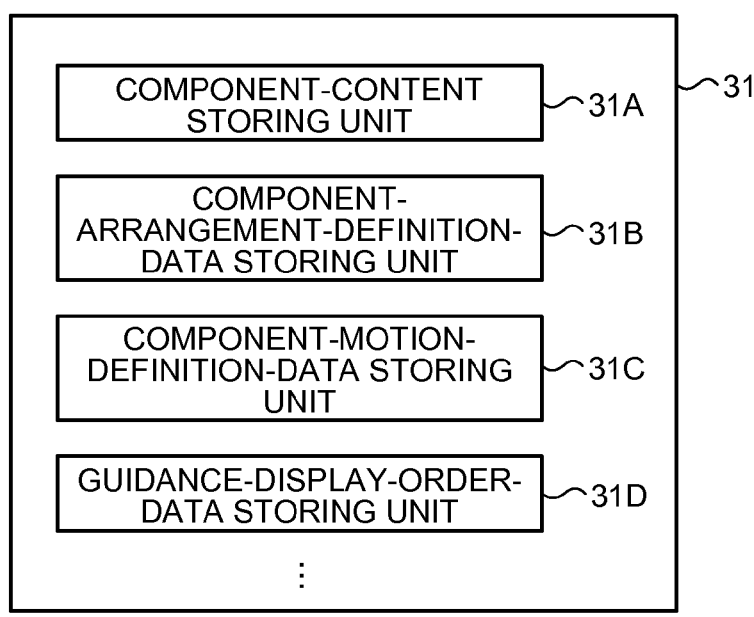
FIG. 7 is a diagram of a more detailed example of the stored contents of the storing unit.
Figure 8:
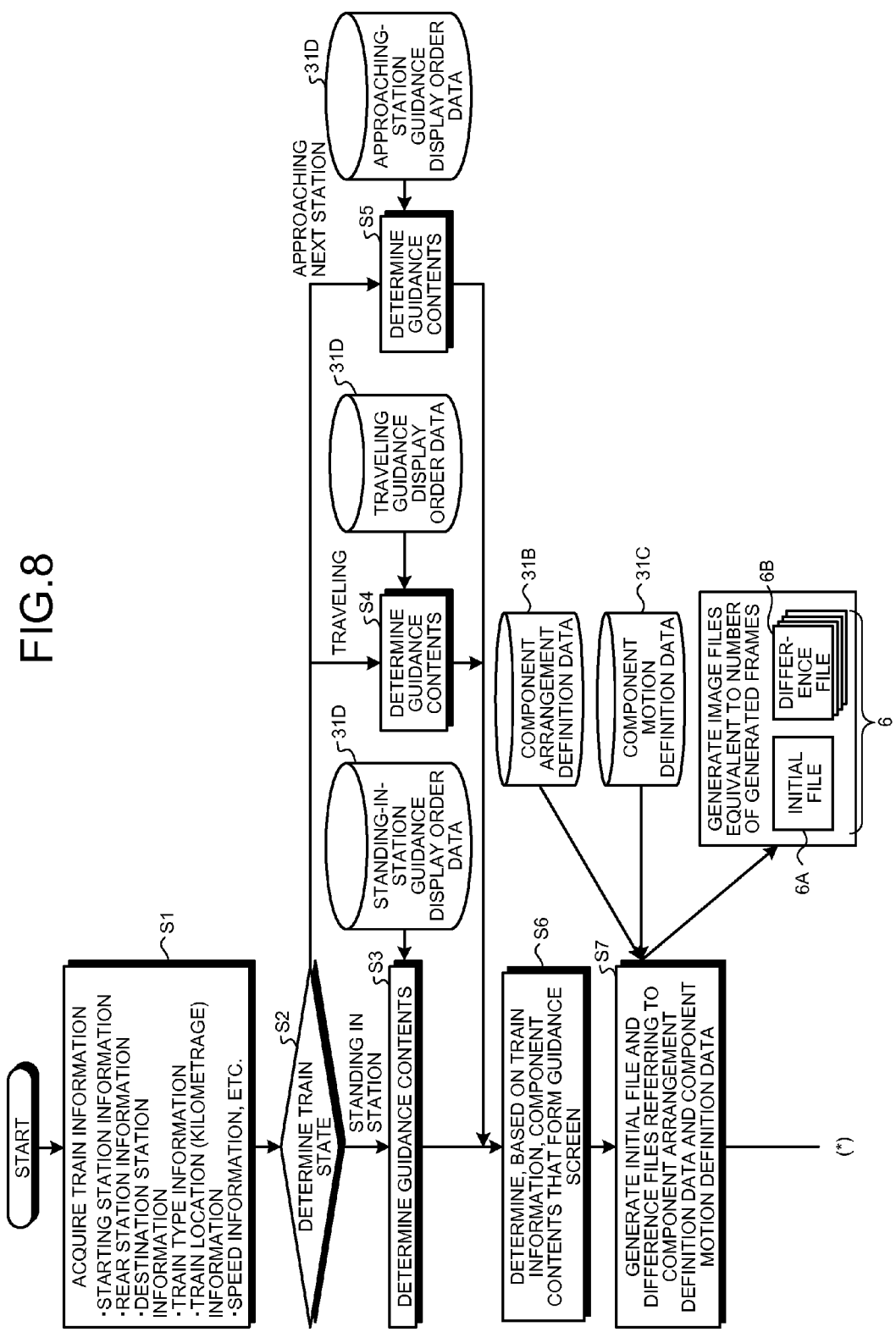
FIG. 8 is a flowchart for explaining an operation in the first embodiment.
Figure 9:
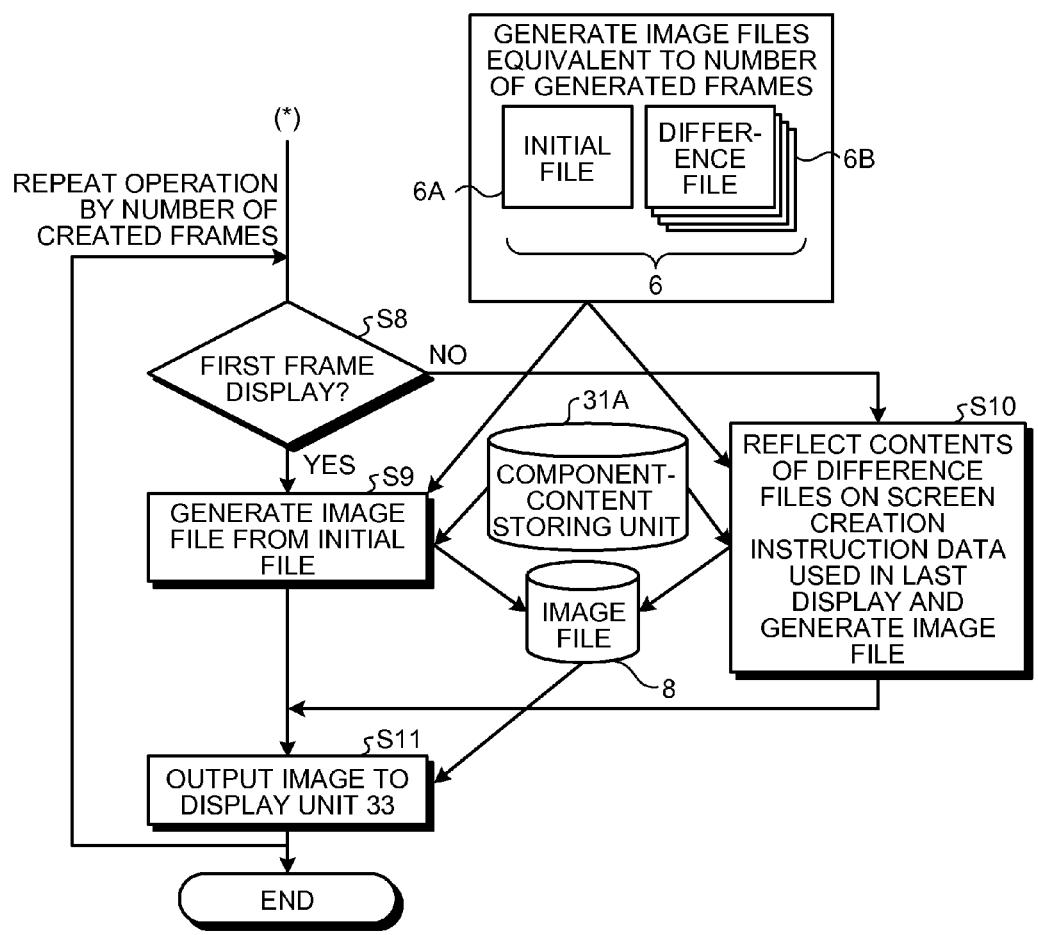
FIG. 9 is a flowchart following FIG. 8.
Figure 10:
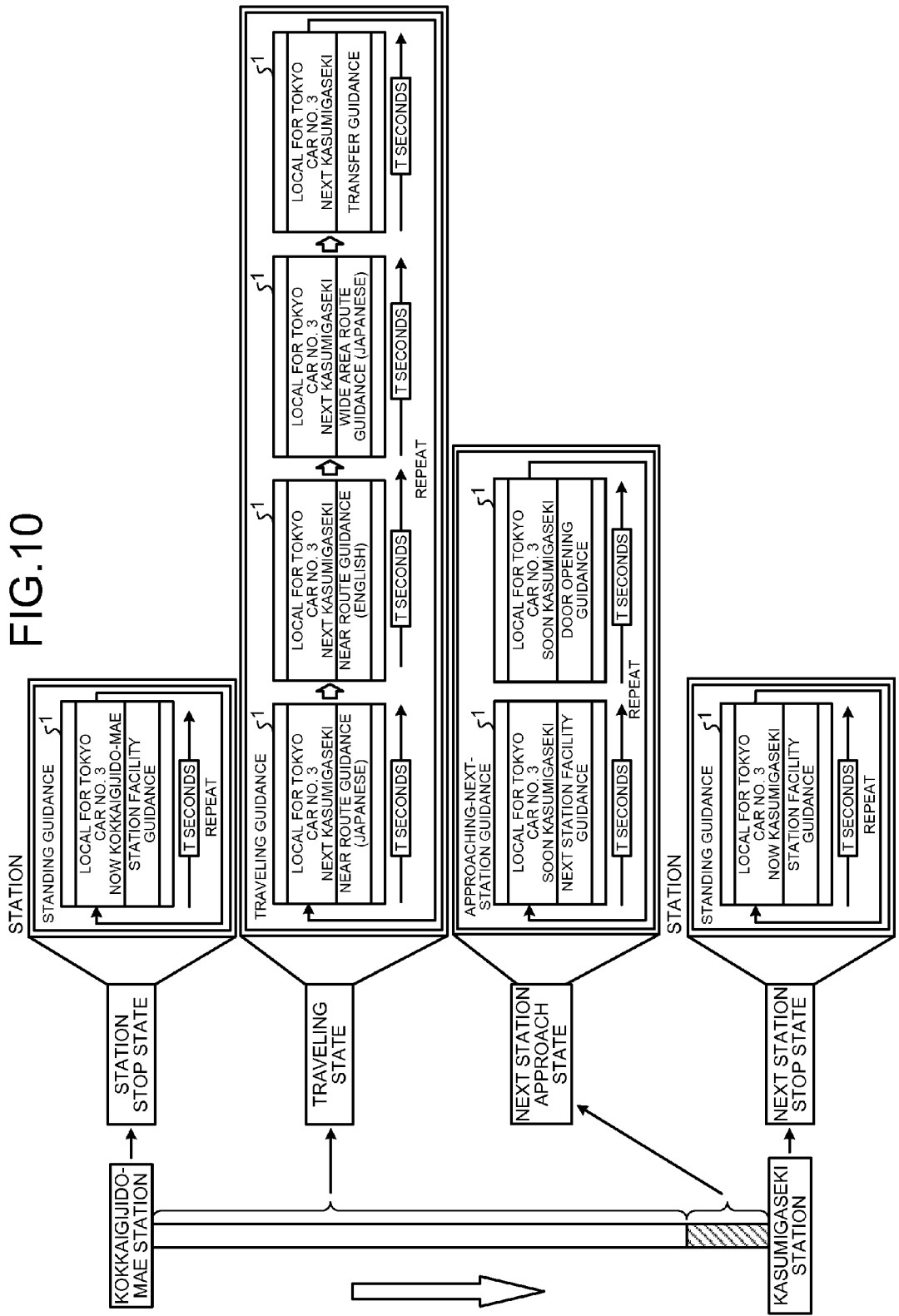
FIG. 10 is a diagram of a guidance display example between stations.

An operation in this embodiment is explained in detail with reference to FIGS. 6 to 10. FIG. 6 is a diagram of a functional configuration of the screen creating unit 32. FIG. 7 is a diagram of a more detailed example of the stored contents of the storing unit 31. FIG. 8 is a flowchart for explaining the operation in this embodiment. FIG. 9 is a flowchart following FIG. 8. FIG. 10 is a diagram of a guidance display example between stations.

As shown in FIG. 6, the screen creating unit 32 includes a screen-creation-instruction-file generating unit 32A configured to generate a screen creation instruction file, which is a file in which creation instruction contents for a plurality of frames (constituent images) continuous in time series included in a guidance content are described, and an image-file generating unit 32B configured to generate the frames based on the screen creation instruction file. As shown in FIG. 7, the storing unit 31 includes, in addition to the components shown in FIG. 3, a guidance-display-order-data storing unit 31D configured to store standing-in-station guidance display order data, traveling guidance display order data, and approaching-station guidance display order data explained below.

As shown in FIG. 8, first, the screen-creation-instruction-file generating unit 32A acquires train information (S1). The train information can be directly acquired from the train information device 11 or can be acquired from the storing unit 31 after being stored in the storing unit 31 once.

Subsequently, the screen-creation-instruction-file generating unit 32A determines a train state based on the acquired train information (S2). Specifically, the train state is classified into, for example, standing at a station, traveling, or approaching the next station. The screen-creation-instruction-file generating unit 32A determines, from the acquired train information, in which state of the three states the train is. These three states are examples. Other classifications can be adopted.

As a result of the determination of the train state at S2, when it is determined that, for example, the train is standing in a station, the screen-creation-instruction-file generating unit 32A determines, referring to the standing-in-station guidance display order data stored in the guidance-display-order-data storing unit 31D, guidance contents (referred to as rolls) that should be sequentially displayed in the stopping station (S3). In the example shown in FIG. 10, when the train is standing in, for example, the "Kokkaigijido-mae" station, a guidance content "station facility guidance" is displayed. This is because it is described in the standing-in-station guidance display order data that the "station facility guidance" should be displayed in the station. The "station facility guidance" is repeatedly displayed in a unit of a predetermined time (this time is represented as T seconds).

When it is determined as a result of the determination of the train state at S2 that the train is traveling, the screen-creation-instruction-file generating unit 32A determines, referring to the traveling guidance display order data stored in the guidance-display-order-data storing unit 31D, guidance contents (rolls) that should be sequentially displayed during traveling (S4). In the example shown in FIG. 10, when the train is traveling between the "Kokkaigijido-mae" station and the "Kasumigaseki" station, according to the description of the traveling guidance display order data, "near route guidance (Japanese)", "near route guidance (English)", "wide area route guidance (Japanese)", and "transfer guidance" are displayed in this order. The guidance contents of "near route guidance (Japanese)", "near route guidance (English)", "wide area route guidance (Japanese)", and "transfer guidance" are respectively displayed in a unit of T seconds in the same manner as explained above. These rolls are repeatedly displayed.

When it is determined as a result of the determination of the train state at S2 that the train is approaching the next station, the screen-creation-instruction-file generating unit 32A determines, referring to the approaching-station guidance display order data stored in the guidance-display-order-data storing unit 31D, guidance contents (rolls) that should be sequentially displayed during the approach to the next station (S5). In an example shown in FIG. 10, when the train is approaching, for example, the "Kasumigaseki" station, "next station facility guidance" and "door opening guidance" are displayed in this order according to the approaching-station guidance display order data. The guidance contents of "next station facility guidance" and "door opening guidance" are displayed in a unit of T seconds in the same manner as explained above. Further, these rolls are repeatedly displayed. Whether the train is approaching the next station is determined according to, for example, whether the distance from the train to the next station is equal to or smaller than a predetermined distance.

Subsequently, the screen-creation-instruction-file generating unit 32A determines, according to the guidance contents (the rolls) that should be displayed, based on the train information, component contents used for forming the guidance screen 1 (S6). For example, as shown in FIG. 4, if the train type 101 is one part, when it is determined based on the train information that the train is a "local train", the screen-creation-instruction-file generating unit 32A determines "local for . . . " as a component content.

Subsequently, the screen-creation-instruction-file generating unit 32A acquires, referring to the component arrangement definition data stored in the component-arrangement-definition-data storing unit 31B, initial arrangement information of the component contents on the guidance screen 1 and acquires, referring to the component motion definition data stored in the component-motion-definition-data storing unit 31C, initial information of motions of the component contents. The screen-creation-instruction-file generating unit 32A generates, from the acquired information, an initial file 6A in which creation instruction contents for creating a first frame included in a guidance content are described (S7). The initial file 6A is one of screen creation instruction files 6 explained above. The screen creation instruction file can be created by, for example, embedding the acquired information in a template file (not shown in the figure) prepared in advance for each of the guidance contents. Such a template file used as a base of the screen creation instruction file is stored in the storing unit 31 in advance.

The component arrangement definition data defines, for example, for each of the guidance contents or each type of guidance, arrangement positions of the component contents used for forming the guidance screen 1 using, for example, coordinate values in XY coordinates set on the guidance screen 1. The component motion definition data defines a motion of each of parts (i.e., each of component contents) that form the guidance screen 1. As a specific example of the definition, for example, concerning a part P1, it is described that the part P1 rotates 90° counterclockwise at fixed angular velocity on the guidance screen 1 from 0 second at the start to T seconds at the end. For example, concerning a part P2, it is described that the part P2 is in a stationary state from 0 second at the start to T seconds at the end, moves at equal speed in a fixed direction from T1 seconds to T2 seconds, and is in the stationary state again from T2 seconds to T seconds at the end. For example, concerning a part P3, it is described that the part P3 does not move. For example, concerning a part P4, it is described that a degree of transparency is 100% from 0 second at the start to T3 seconds, the degree of transparency decreases to 50% from T3 seconds to T4 seconds, and the part P4 is displayed at a fixed degree of transparency again from T4 seconds to T seconds at the end. For example, concerning a part P5, it is described that the part P5 is displayed in a size of 100% from 0 second at the start to T5 seconds, the size is increased to 150% from T5 seconds to T6 seconds, and the fixed size is maintained again from T5 seconds to T seconds in the end.

The initial file 6A includes an instruction for initial arrangement positions of the component contents obtained from the component arrangement definition data and an instruction for an initial degree of transparency of the component contents (i.e., the initial information of motion explained above) obtained from the component motion definition data, for example, when the degree of transparency of the component contents temporally changes. Besides, the initial file 6A includes information necessary for creation of the first frame such as association information of the component contents used for forming the guidance screen 1 and an image file actually stored in the component-content storing unit 31A. The initial file 6A is desirably, for example, a text file for the purpose of reducing a data storage capacity. In this case, instruction contents necessary for creation of the guidance screen 1 are described in a text format.

Subsequently, the screen-creation-instruction-file generating unit 32A generates, based on the component motion definition data, a plurality of difference files 6B in which creation instruction contents for remaining all frames following the first frame are individually described (S7). The difference files 6B are files for instructing creation of difference display contents for the continuous frames and are the screen creation instruction files 6 explained above.

To specifically explain the difference file 6B, it is assumed that the guidance contents are formed in T seconds and, for example, M frames are generated during this time (M is an integer equal to or larger than 2). M is set to a number equal to or larger than a number enough for smoothly displaying the guidance contents. For example, if M is the number of frames of about thirty to sixty in one second, a change in the component contents is smoothly displayed like an animation moving image. A motion example of the parts described in the component motion definition data, for example, the motion of the part P1 explained above is explained as an example. It is assumed that the part P1 rotates 90° counter-clockwise on the guidance screen 1 in T seconds. Then, the part P1 rotates (90/M)° counterclockwise between continuous frames. As in this example, the screen-creation-instruction-file generating unit 32A calculates, based on the description of the component motion definition data, a motion among the frames as difference information and describes the difference information in the difference file 6B. Specifically, after generating the initial file 6A, the screen-creation-instruction-file generating unit 32A generates a first difference file 6B in which, for example, difference information indicating that the part P1 rotates (90/M)° counterclockwise is described as creation instruction contents for a second frame following the first frame. In this configuration, the second frame can be created from the initial file 6A and the first difference file 6B. Similarly, the screen-creation-instruction-file generating unit 32A generates the second difference file 6B in which creation instruction contents for a third frame following the second frame are described as difference display contents between the frames. The third frame can be created from the initial file 6A and the first and second difference files 6B. The same holds true in other cases. The initial file 6A and the difference files 6B are stored in the storing unit 31.

As explained above, in this embodiment, the initial file 6A and the difference files 6B are generated as the screen creation instruction files 6 for creating a plurality of frames included in a guidance content. However, it is also possible to create files same as the initial file 6A for all the frames instead of generating the difference files 6B. For example, it is also possible to generate, from the beginning, a file in which contents of the initial file 6A and the first difference file 6B are combined instead of generating the first difference file 6B to correspond to the second frame. As in this embodiment, because the difference files 6B are generated, it is unnecessary to describe contents redundant among the frames. Therefore, there is an effect that it is possible to reduce a data storage capacity.

Display processing for guidance contents by the image-file generating unit 32B is explained. As shown in FIG. 9, first, the image-file generating unit 32B determines whether display is first frame display (S8). When the display is started, the display is the display of the first frame, i.e., the first frame display (yes at S8). In this case, the image-file generating unit 32B selects, based on the initial file 6A, necessary component contents from the component-content storing unit 31A and generates a first image file 8 (S9). The image file 8 is, for example, an RGB file. The image-file generating unit 32B outputs an image based on the generated first image file 8 to the display unit 33 as the first frame (S11).

On the other hand, when the display is display of a frame after the first frame (a frame other than the first frame) as a result of the determination at S8 (No at S8), the image-file generating unit 32B generates, based on data contents obtained by reflecting contents of the difference file 6B for creating a display target frame on screen creation instruction data used in the last display, the image file 8 corresponding to the data contents (S10). The screen creation instruction data used in the last display is data of the initial file 6A or the initial file 6A and the difference file 6B used for creation of a frame displayed immediately before the frame. For example, when a second frame is displayed, the screen creation instruction data used in the last display is data of the initial file 6A. For example, when a third frame is displayed, the screen creation instruction data used in the last display is data of the initial file 6A and the first difference file 6B. That is, contents of the difference file 6B of the display target frame are added to data used for creation of the immediately preceding frame and already expanded in the memory to simplify processing and reduce the data storage capacity.

Subsequently, the image-file generating unit 32B outputs an image based on the generated image file 8 to the display unit 33 as the display target frame (S11). Thereafter, the image-file generating unit 32B repeats the same operation until display of all frames ends. In this way, the image-file generating unit 32B generates the image files 8 based on the screen creation instruction files equivalent to the number of generated frames, expands the image files 8 in the display section 33, and displays the image files 8 in time series to display guidance contents (rolls).

The image-file generating unit 32B generates an image adapted to a size of an actual guidance screen from the image file 8 and stores the image in a frame buffer (not shown in the figure) provided in the display unit 33. The display unit 33 reads out the image in the frame buffer and screen-displays the image.

The frame buffer is desirably set to a capacity capable of storing a plurality of guidance contents. In this case, the image-file generating unit 32B can store, in the frame buffer, an image group and the like concerning a guidance content scheduled to be displayed next in addition to an image group concerning a displayed guidance content. Consequently, after the display of the displayed guidance content ends, it is possible to immediately sequentially read out and display the image group concerning the guidance content scheduled to be displayed next. Therefore, the display is smoothly switched.

After generating an image from the image file 8 and storing the image in the frame buffer, the image-file generating unit 32B can erase the image file 8 from which the image generation ends. Consequently, the image file 8 having a large data size does not need to be stored after the image generation. It is possible to substantially reduce the data storage capacity.

In the traveling guidance in FIG. 10, four kinds of rolls are displayed in order in a unit of T seconds. For example, "near route guidance (English)" is displayed following "near route guidance (Japanese)". Therefore, while the image-file generating unit 32B carries out the processing shown in FIG. 9 and causes the display unit 33 to display "near route guidance (Japanese)", the screen-creation-instruction-file generating unit 32A can carry out the processing shown in FIG. 8 concerning "near route guidance (English)" to be displayed next and generate the initial file 6A and the difference files 6B. That is, the image file creation processing by the image-file generating unit 32B concerning a displayed guidance content and the generation processing (FIG. 8) for the screen creation instruction files 6 by the screen-creation-instruction-file generating unit 32A concerning a guidance content scheduled to be displayed next can be performed in parallel. Consequently, it is unnecessary to start the display processing after all the screen creation instruction files 6 for the four kinds of rolls are generated. The configuration is suitable for smoothly shifting the rolls.

In FIG. 10, for example, when the train is in a traveling state, image generation processing by the image-file generating unit 32B concerning a traveling guidance content scheduled to be displayed following a displayed guidance content and image generation processing by the image-file generating unit 32B concerning a next-station-approaching guidance content scheduled to be displayed in a next-station approaching state can be performed in parallel. For example, image generation processing concerning "near route guidance (English)" and image generation processing concerning "next station facility guidance" of the next-station-approaching guidance content can be performed in parallel during display of "near route guidance (Japanese)" of the traveling guidance content. Consequently, when a train state change occurs, it is possible to smoothly realize display switching by instructing the image-file generating unit 32B to interrupt. Image groups of the guidance contents created in the parallel processing are stored in the frame buffer as explained above.

When a data format of the data stored in the component-content storing unit 31A is, for example, so-called vector data, the image-file generating unit 32B can easily generate, based on the initial file 6A and the difference files 6B, an image file in which component contents are moved. However, this embodiment is not limited to a display method in which the data format is used.

Figure 11:
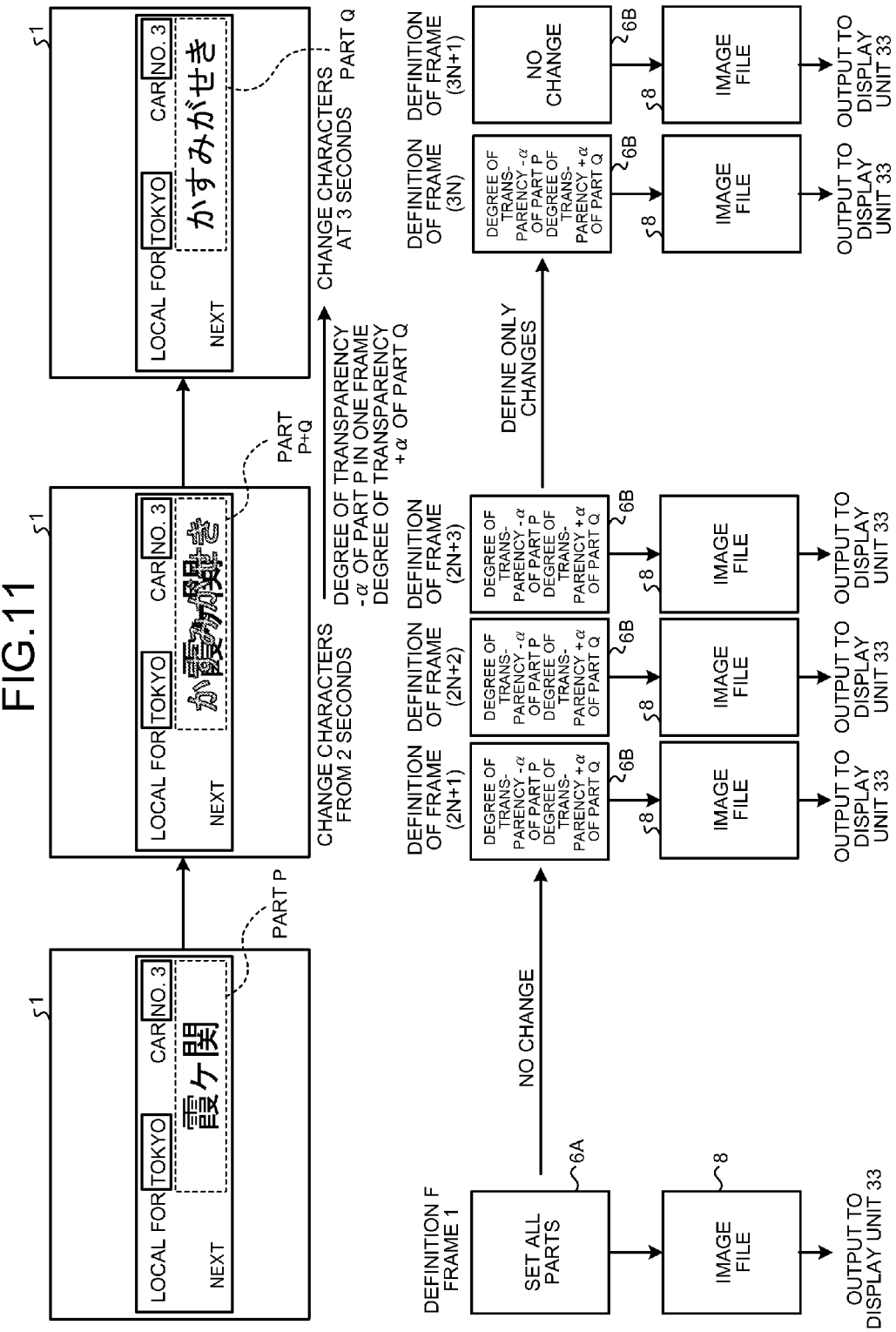
FIG. 11 is a diagram for schematically explaining a method of displaying guidance contents.
Figure 12:
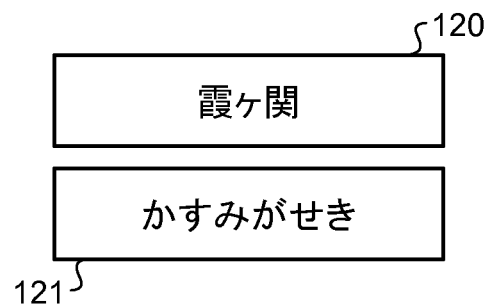
FIG. 12 is a diagram of an example of component contents.

FIG. 11 is a diagram schematically showing a display method for the guidance contents. FIG. 12 is a diagram of an example of component contents displayed in FIG. 11. In an example shown in FIG. 11, a display content of a part P, which is one of the parts included in the guidance screen 1, changes, for example, between 2 seconds and 3 seconds and a station name to be displayed is changed.

That is, characters are changed from "Kasumigaseki in Chinese characters" to "Kasumigaseki in hiragana characters".

In FIG. 12, a component content 120 arranged in the part P and a component content 121 arranged in a part Q are shown.

The component contents 120 and 121 are respectively still images in which "Kasumigaseki in hiragana characters" and "Kasumigaseki in Chinese characters" are written.

As shown in FIG. 11, concerning the "frame 1", which is the first frame, arrangement information and the like concerning all parts are described in the initial file 6A. After the image file 8 is created based on the initial file 6A, an image corresponding to the image file 8 is output in the display unit 33. Because there is no change in the display of the guidance screen 1 from 0 second at the start to, for example, 2 seconds, a motion is not set in the difference file 6B. The same image is output according to the image file 8 same as the image file 8 for the "frame 1". In the following explanation, it is assumed that, for example, N frames are displayed in one second.

Subsequently, concerning a "frame (2N+1)", which is a (2N+1)th frame, displayed after 2 seconds elapses, it is described in the difference file 6B used for creation of the "frame (2N+1)" that "a degree of transparency of the part P changes by −α and a degree of transparency of the part Q changes by +α". After the image file 8 is created based on the difference file 6B and the initial file 6A, an image corresponding to the display unit 33 is output. Thereafter, an operation up to a "frame (3N+1)" is as explained with reference to FIGS. 8 and 9. In the case of frames that form a moving image, N is desirably, for example, about thirty to sixty. If N is in this range, display is smoothly performed. However, N can exceed this range.

As it is seen from comparison of the display content of the part P shown in FIG. 11 and the component content 120 shown in FIG. 12, a motion is specified such that the component content 120 is displayed from the start to 2 seconds and the degree of transparency of the component content 120 decreases and the degree of transparency of the component content 121 increases from 2 seconds to 3 seconds, whereby a change of the characters ends at 3 seconds.

As a result, "Kasumigaseki in hiragana characters" is displayed.

The motion is obtained by combining the motion of the component content 110 shown in FIG. 5(d) (excluding the translation).

As explained above, according to this embodiment, the guidance screen 1 for the guidance contents is formed using the component contents. Therefore, it is possible to substantially reduce the data storage capacity necessary for display, i.e., the capacity of the storing unit 31.

According to this embodiment, it is possible to increase an amount of information provided to passengers and a degree of attention to the information compared with those obtained when a still image is used. Therefore, a visual appeal to the passengers increases and it is possible to more effectively provide information.

According to this embodiment, the guidance screen 1 is formed by the component contents and the arrangement and the motion of the component contents are defined by the component arrangement definition data and the component motion definition data. Therefore, it is possible to easily cope with addition and correction of display contents.

In this embodiment, the difference files 6B are generated as the image creation instruction files for creating the second and subsequent frames. Therefore, because it is unnecessary to describe display contents redundant among the frames, it is possible to reduce the data storage capacity.

After generating an image from the image file 8 and storing the image in the frame buffer, the image-file generating unit 32B can erase the image file 8 from which the image generation ends. Consequently, the image file 8 having a large data size does not need to be stored after the image generation. It is possible to substantially reduce the data storage capacity.

The image file creation processing by the image-file generating unit 32B concerning a displayed guidance content and the generation processing for the screen creation instruction files by the screen-creation-instruction-file generating unit 32A concerning a guidance content scheduled to be displayed next can be performed in parallel. Consequently, an image creation instruction file of the next guidance content need not start to be created after display of the displayed guidance content ends. A period in which no guidance content is displayed does not occur between the guidance contents.

In FIG. 10, the image generation processing concerning a guidance content scheduled to be displayed following a displayed guidance content and the image generation processing concerning a guidance content scheduled to be displayed in a train state scheduled following the train state can be performed in parallel. Consequently, when a change occurs in the train state, it is possible to smoothly realize display switching by instructing the image-file generating unit 32B to interrupt.

For example, in the traveling guidance shown in FIG. 10, a display content of a display region in the lower half of the guidance screen changes according to a guidance content. However, a display content of a display region in the upper half does not change among guidance contents. For example, when a guidance content "near route guidance (Japanese)" and a guidance content "near route guidance (English)" are compared, the display content changes only in the display region in the lower half. Therefore, if the guidance screen is divided into a plurality of display regions and the initial file 6A and the difference files 6B are created in a unit of the display region, when the guidance contents are repeatedly displayed in a unit of T seconds as shown in FIG. 10, these files concerning the display region without a change in the display content can be shared. Consequently, it is possible to reduce a generation processing load for the screen creation instruction files 6.

A change in a color can also be added to a motion of a component content. For example, it is possible to perform display for increasing a degree of attention of passengers by, for example, gradually changing character display from black to blue and red as the train approaches the next station.

In this embodiment, functions necessary for guidance content creation such as the screen creating unit 32, the component-content storing unit 31A, the component-arrangement-definition-data storing unit 31B, and the component-motion-definition-data storing unit 31C are provided in the display device 30. According to such a configuration, when a plurality of display devices 30 are provided in a car, such a configuration is suitable for displaying different guidance contents for each of the display devices 30.

On the other hand, the functions necessary for the guidance content creation can be provided in, for example, the dividing devices 21 shown in FIG. 1. In FIG. 1, a plurality of display devices 30 are connected to the one dividing device 21. According to such a configuration, even when a plurality of display devices 30 are provided in a car, the screen creating units 32 equivalent to the number of the dividing devices 21 are provided. Therefore, the configuration is more inexpensive than the configuration in this embodiment. However, such a configuration is suitable for displaying the same guidance contents in all the display devices 30 in the car.

As still another configuration, the functions necessary for the guidance content creation can be provided in, for example, the video information distributing device 20. In such a configuration, because the number of the set screen creating units 32 is further reduced, the configuration is still more inexpensive. However, the configuration is suitable for displaying the same guidance contents in all the display devices 30 in the train. In this case, the video information distributing device 20 distributes created guidance contents to the display devices 30 rather than distributing component contents.

According to this embodiment, it is also possible to display a still image. That is, "no motion" only has to be defined for all component contents in the component motion definition data. For example, in FIG. 11, a state in which a substantial still image is displayed from the start of display to 2 seconds is shown.

In the guidance content in this embodiment, a photographed video can be embedded in a part of the guidance screen 1 and displayed at the same timing as frame display. Further, a photographed video display portion can be moved, for example, transferred in the guidance screen 1. However, because the photographed image requires a data size, it is desirable to use the photographed video while limiting the data size. When such a photographed video is used, as in Patent Literature 3, a path for transmitting data from the video information distributing device 20 to the display devices 30 can be separated in transmitting component contents and in transmitting the photographed video. That is, in Patent Literature 3, the photographed video is directly transmitted to the display devices 30 through the dividing devices 21 but not through the train information devices 11.

Second Embodiment.

In the first embodiment, the system and the method for selecting, based on the train information obtained from the train information device 11, component contents necessary for forming guidance contents from the component content group stored in the component-content storing unit 31A in advance, assembling the component contents, giving a motion to the component contents to display guidance contents are explained.

In a second embodiment, a system and a method for incorporating and displaying, in guidance contents, information not directly obtained from the train information device 11, which is, for example, temporary information provided from the outside of a train, are explained. The temporary information is, for example, service information, accident information, or a newsflash. Such temporary information is provided, for example, from the ground station 51 to the video information distributing device 20 by radio communication through the radio transmission and reception device 50.

Figure 13:
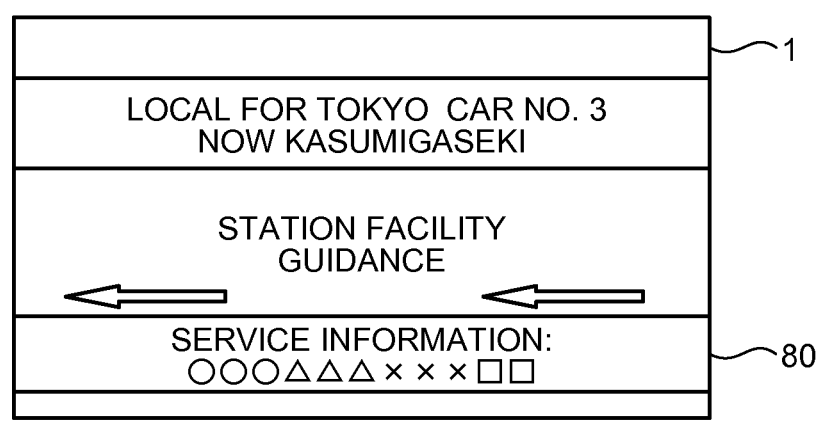
FIG. 13 is a diagram of a display example of a guidance content according to a second embodiment.

FIG. 13 is a diagram of a display example of a guidance content according to this embodiment. FIG. 14 is a diagram of an example of a component content in which temporary information (e.g., temporary service information) described in text is represented as character rendering images. In FIG. 13, a part 80 that displays the temporary information is arranged to be overwritten on a display portion of "station facility guidance" of the guidance screen 1. A component content 125 shown in FIG. 14 is selected as the part 80. A motion of the component content 125 is defined such that characters move in a direction of an arrow shown in FIG. 13. In this way, in the part 80, the temporary service information is subjected to so-called telop display. A display content of the part 80 is displayed while moving in the direction of the arrow.

To perform the display shown in FIG. 13, after the temporary information is acquired, the screen-creation-instruction-file generating unit 32A creates the component content 125 obtained by processing a content of the temporary information into character rendering images. In the component arrangement definition data, initial arrangement positions of component contents created to correspond to temporary information are defined in advance. In the component motion definition data, motions of the component contents created to correspond to the temporary information are defined in advance. FIG. 13 shows an example of the initial arrangement position and the motion. The screen-creation-instruction-file generating unit 32A generates, based on the component arrangement definition data and the component motion definition data, the initial file 6A and the difference files 6B explained in the first embodiment concerning the component contents, which form the guidance screen 1, besides the created component content 125. The image-file generating unit 32B sequentially generates, based on the initial file 6A and the difference files 6B, image files for respective frames and outputs images corresponding to the image files to the display unit 33.

After obtaining not only the temporary information but also other general information different from train information, the screen-creation-instruction-file generating unit 32A can create the component content 125 obtained by processing contents of the information into character rendering images and perform the telop display using the component content 125. For example, the screen-creation-instruction-file generating unit 32A can create the component content 125 obtained by processing contents of fixed-form information into character rendering images and perform the telop display using the component content 125. Examples of the fixed-form information include contents display only between certain stations.

The component content 125 is not limited to only the character rendering images. The component content 125 can include general rendered images such as signs, figures, or pictures. Alternatively, the component content 125 can display information using, for example, signs, figures, or pictures or a combination of the signs, the figures, and the pictures without including characters. That is, after the temporary information or the like is obtained, the screen-creation-instruction-file generating unit 32A creates the component content 125 obtained by processing a content of the temporary information or the like into rendered images using data such as characters, signs, figures, or pictures prepared in advance.

In the display example shown in FIG. 13, the display of the temporary service information by the part 80 is performed to be overwritten on the displayed guide content. Therefore, there is a problem in that a part of the guidance content is not seen. Therefore, in displaying the temporary information, it is also possible to reduce and display the entire displayed guidance content in the guidance screen 1, arrange the part 80 in a formed margin portion, and define a motion to perform telop display same as the telop display explained above in the part 80. In this case, it is somewhat difficult to see the entire guidance content because the entire guidance content is reduced. However, because the telop display does not overwrite a part of the guidance content, it does not occurs that information of the part of the guidance content is not displayed.

As explained above, while reducing and displaying the entire guidance content (in the example shown in the figure, for example, station facility guidance), which is displayed on the guidance screen, in the guidance screen according to the component arrangement definition data and the component motion definition data, the screen creating unit 32 can arrange the component content 125 different from the component contents, which form the guidance content, in the margin portion formed in the guidance screen 1 by the reduction of the entire guidance content and incorporate and display the component content 125 in the margin portion. As explained below, a display portion of the guidance content can be replaced with CM guidance.

FIG. 15 is a diagram of a display example of CM guidance according to this embodiment. In FIG. 15(a), for example, a CM screen 81A is displayed in a substantially entire display region of the guidance screen 1. CM guidance is displayed on the CM screen 81A. The CM (advertisement) guidance is not a guidance content created using component contents. The CM guidance is, for example, a content formed by advertisement content data distributed from the video information distributing device 20 to the display device 30 after being transmitted from the ground station 51 to the video information distributing device 20 through the radio transmission and reception device 50 and is, for example, a moving image or a still image (see the first embodiment).

In FIG. 15(b), the display region of the CM guidance is reduced from the CM screen 81A to a CM screen 81B under the control by the screen creating unit 32. When the display region is reduced, the display region is reduced to the CM screen 81B at, for example, an equal magnification in both the horizontal direction and a direction orthogonal to the horizontal direction with respect to the CM screen 81A and further reduced such that margins are formed in a region on the lower side and a region on the left side in the guidance screen 1. The display region can be reduced in one of the horizontal direction and the direction orthogonal to the horizontal direction. A reduction magnification is allowed to be different between the horizontal direction and the direction orthogonal to the horizontal direction. The CM screen 81A can also be reduced such that margins are formed in places other than the places of the example shown in the figure. The CM screen 81A is not limited to the reduction. Movement of the CM screen 81A can be combined with the reduction.

Reduction control for the display region from the CM screen 81A to the CM screen 81B by the screen creating unit 32 is not performed by the reduction of the component contents explained in the first embodiment and is performed by reduction or expansion control for the display region usually used in the display device in the past.

In FIG. 15(b), a part 80A is incorporated and displayed in, for example, the margin portion on the lower side in the guidance screen 1 of the margin portions formed in the guidance screen 1. The part 80A is a component content, for example, a component content that displays temporary information. As in the case of FIG. 13, the motion of the part 80A is specified to move in a direction of an arrow in the figure and subjected to so-called telop display. The other components and operations are the same as those in FIG. 13, for example, fixed-form information other than the temporary information can be displayed in the part 80A. The part 80A shown in FIG. 15(b) can be telop-displayed to be overwritten on the CM screen 81A shown in FIG. 15(a).

In FIGS. 13 and 15, the moving direction of the component contents (e.g., the component content 125) used for the telop display is the horizontal direction. However, the moving direction is not limited to this. The moving direction can be an arbitrary direction in the guidance screen 1 including the vertical direction. For example, in FIG. 15(b), the telop display can also be performed by arranging the component content, which displays the temporary information, in, for example, the margin portion on the left side in the guidance screen 1 of the margin portions formed in the guidance screen 1 and moving the component content in the vertical direction.

In the above explanation, the temporary information is obtained from, for example, the ground station 51. Besides, for example, the temporary information can be input to the video information distributing device 20 via a predetermined input means by a crew member or the like on board. For example, the crew member can input temporary information concerning a failure or an accident that occurs in the train or a sick person in the train to the video information distributing device 20 via an input screen or the like of an on-board monitor device. The screen creating unit 32 can process a component content used for telop display based on the input information. If the temporary information input on board in this way is telop-displayed on the guidance content in the same manner as explained above, it is possible to provide information with a higher real-time property than the information from the ground station 51.

According to this embodiment, for example, the temporary information or the fixed-form information provided from the outside of the train or input on board is processed into a component content and the component content is incorporated and displayed in the guidance screen 1 during display of a guidance content. Therefore, it is possible to provide passengers with the temporary information or the like on a real time basis.

According to this embodiment, for example, the temporary information or the fixed-form information provided from the outside of the train or input on board is processed into a component content and the component content is incorporated and displayed in the guidance screen 1 during display of an advertisement content. Therefore, it is possible to provide passengers with the temporary information or the like on a real time basis.

Further, according to this embodiment, a display region of the guidance content or the advertisement content is reduced during the display of the guidance content or the advertisement content and the temporary information or the like is displayed in a formed margin portion. Therefore, visibility of the temporary information or the like is improved. The other components, operations, and effects of this embodiment are the same as those in the first embodiment.

Third Embodiment.

In a third embodiment, as a specific example of a motion of component contents, a motion in which parts are displayed as if rotating on a guide screen according to a combination of reducing and expanding motions is described. Components and the like in this embodiment are the same as those in the first and second embodiments. Motions are defined in component motion definition data.

Figure 16:
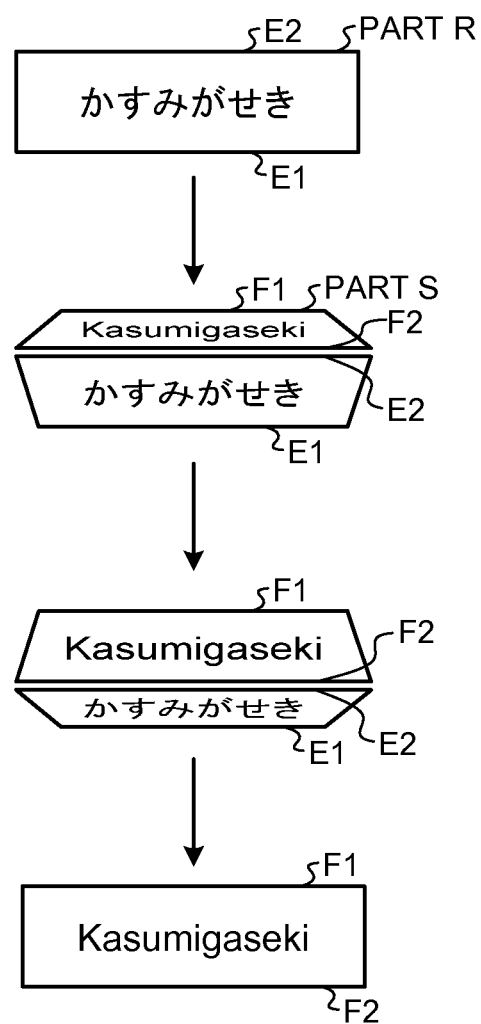
FIG. 16 is a diagram of a motion example of component contents in a third embodiment.

FIG. 16 is a diagram of a motion example of component contents in this embodiment. FIG. 17 is a diagram of an example of component contents. FIG. 18 is a schematic diagram of reducing directions of a part R and a part S.

As shown in FIG. 16, for example, in a rectangular region on a guidance screen, the part R is reduced and the part S is expanded, whereby the parts R and S are displayed as if rotating.

Specifically, display is switched from "Kasumigaseki in hiragana characters" of the part R to "Kasumigaseki" of the part S.

The top part in the figure shows a motion start state and the bottom part in the figure shows a motion end state. The part R is displayed based on a component content 126 shown in FIG. 17 and the part S is displayed based on a component content 127 shown in FIG. 17.

First, a motion of the part R is explained. In the figure, the vertical direction is referred to as first direction and a direction orthogonal to the first direction is referred to as second direction. The part R is reduced, for example, at a fixed reducing speed (referred to as a first reducing speed.) in the first direction in a state in which an end E1, which is one end of the part R in the first direction, is fixed not to move in the first direction. That is, the motion of the part R is specified such that the part R is reduced with respect to the first direction from a motion start to a motion end and the width in the first direction is reduced to 0 in the operation end state. Therefore, an end E2, which is the other end of the part R, opposed to the end E1 moves downward at the first reducing speed. Consequently, the part S is displayed on the upper side of the end E2 and the formed region gradually increases.

The part R is reduced in the first direction and reduced in the second direction as well. The reducing speed of the part R in the second direction increases at a fixed rate from 0 to predetermined reducing speed (referred to as second reducing speed.) from the end E2 toward the end E1. Therefore, although the length of the end E2 is fixed, the length of the end E1 decreases as time elapses. Therefore, there is an effect of displaying the part R with temporally changing perspective sensation. The part R looks as if rotating downward with the second direction set as a rotation axis. In the upper part of FIG. 18, reducing directions of the part R are schematically indicated by arrows. To indicate that the reducing speed increases downward, the sizes of the arrows in the horizontal direction are shown to increase downward.

A motion of the part S is explained. For convenience of explanation, the motion of the part S is specified as a reverse motion of a motion temporally reversed from a motion end time to a motion start time. That is, when the part S shifts from the motion end state in the bottom part of FIG. 16 to the motion start state in the top part of FIG. 16, the part S is reduced at the first reducing speed in the first direction in a state in which an end F1, which is one end of the part S in the first direction, is fixed not to move in the first direction. That is, the motion of the part S is specified such that the part S is reduced with respect to the first direction and the width in the first direction is reduced to 0 in the motion start state. The part S is reduced in the first direction and reduced in the second direction as well. The reducing speed of the part S in the second direction increases from 0 to the second reducing speed at a fixed rate from an end F2 toward the end F1. Consequently, like the part R, the part S can be displayed with temporally changing perspective sensation. In the lower part of FIG. 18, the reducing directions of the part S in time reversal are schematically indicated by arrows. However, when the motion of the part S is viewed in a time positive direction, actually, the motion is equivalent to an expanding motion. As shown in FIG. 16, the end F2 of the part S and the end E2 of the part R are arranged to be opposed to each other.

According to this embodiment, by combining a combination of the reducing motion of the part R and a combination of the expanding motion of the part S as explained above, it is possible to display the parts R and S as if rotating.

This embodiment can be applied not only when there are two parts but also when there are three or more parts. Independent display of the part R and the part S is naturally possible. In this case, character is rotated to disappear or appear.

In the explanation in this embodiment, the rotating direction is the downward direction in the figure. However, the same explanation applies when the rotating direction is an arbitrary direction on the guide screen.

Fourth Embodiment.

In a fourth embodiment, a specific display example of a guidance content by a video information distributing and displaying system is explained. Configurations and the like of the video information distributing and displaying system according to this embodiment are the same as those in the first to third embodiments.

Figure 19:
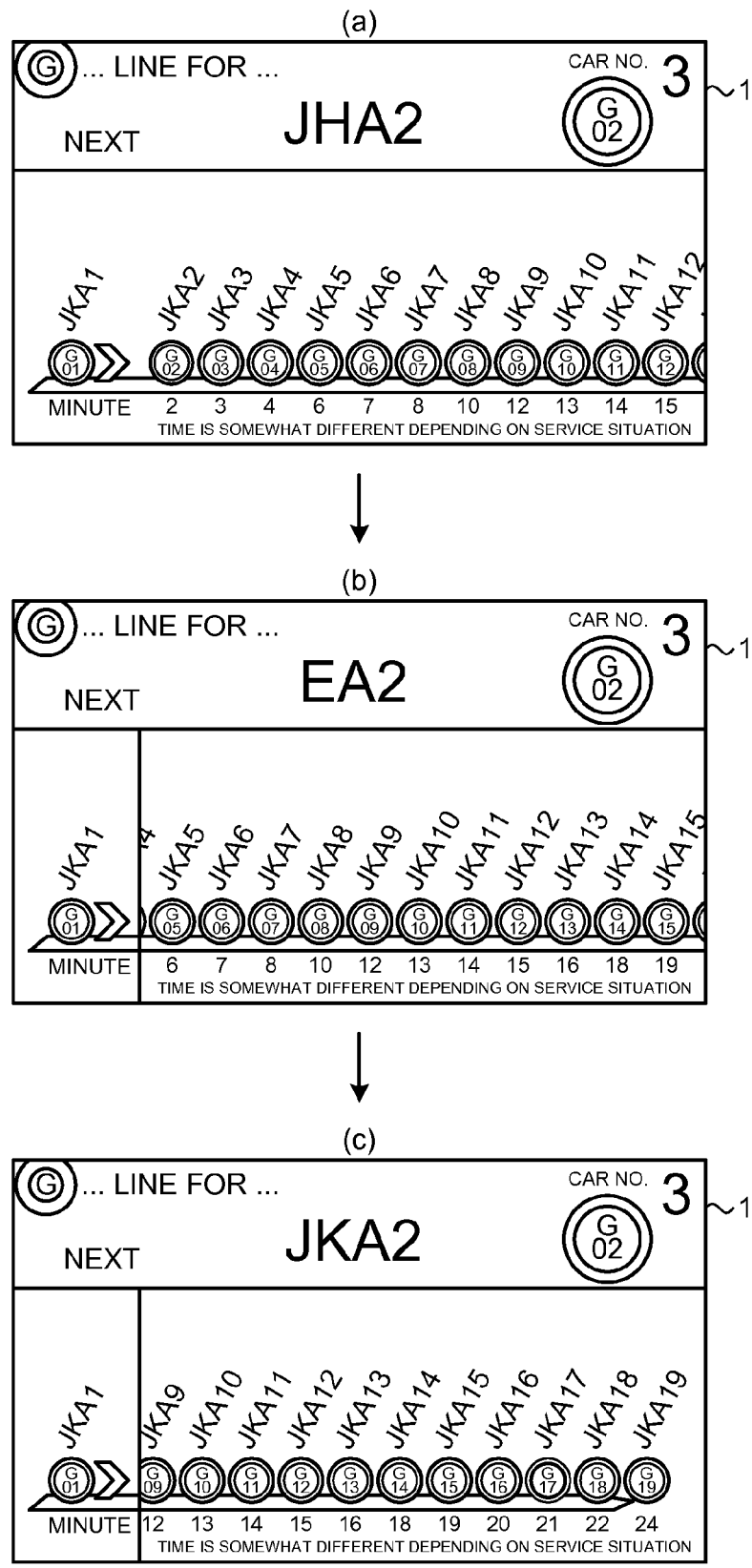
FIG. 19 is a diagram of a display example of route guidance according to a fourth embodiment.

FIG. 19 is a diagram of a display example of route guidance according to this embodiment. Specifically, FIG. 19 shows an example of route guidance displayed on the display device 30 in a car of a train traveling on a "AA line" representing a specific route. Display contents of the guidance screen 1 are scrolled in the screen left direction in the order of display examples (a), (b), and (c) as indicated by arrows. In this figure, display example screens of the display examples (a), (b), and (c) are shown in time series. However, actual display is smoothly scrolled from the screen right in the left direction like an animation moving image. The display contents are explained in detail below.

First, a display content in the upper part of the guidance screen 1 is explained. As shown in FIG. 19, in the upper part of the guidance screen 1, display indicating the next stopping station changes in the order of "JHA2", "EA2", and "JKA2". "JHA2" is hiragana notation of a station name of the next stopping station (e.g., Kasumigaseki in hiragana characters). "EA2" is Roman alphabet notation (e.g., Kasumigaseki). "JKA2" is Chinese character notation (e.g., Kasumigaseki in Chinese characters). Switching from "JHA2" to "EA2" is realized when a component content representing "JHA2" and a component content representing "EA2" continuously change according to, for example, the motion explained in the third embodiment (FIG. 16, etc.). The same applies to display switching from "EA2" to "JKA2". "AA line in Japanese", "BB", "for in Japanese", "car number in Japanese", and "next in Japanese" in the guidance screen 1, on which "JHA2" is displayed, are respectively component contents. The component contents are respectively switched to English notations such as "AA Line", "BB", "for", "Car No.", and "Next", for example, as in the switching of the next stopping station according to the switching from "JHA2" to "EA2". Besides, "G", "G02", "3" representing a car number, and the like are also component contents.

Display contents in the lower part of the guidance screen 1 are explained. As shown in FIG. 19, in the lower part of the guidance screen 1, a plurality of station names arrayed in arrival order from a starting station to a terminal station are scroll-displayed. Specifically, on the guidance screen 1 on which "JHA2" is displayed (a display example (a)), station names "JKA1" to "JKA12" are displayed in array in order from the left to the right on the guidance screen 1. Thereafter, as illustrated in a display example (b), in a state in which display of "JKA1" of the starting station is fixed, display control is performed such that the station name "JKA2" and the subsequent station names are scrolled from the right to the left, the station name "JKA12" and the subsequent station names sequentially appear from the right end of the guidance screen 1, and, as a result of moving to the left, the station names reaching a boundary of a display region sequentially disappear. As shown in the guidance screen 1 on which "JKA2" is displayed in the upper part (a display example (c)), the scroll display is stopped in a state in which "JKA19" of the terminal station is located at the right end of the guidance screen 1. Pictorial symbols "G02" to "G19" representing the stations and estimated arrival times are respectively displayed under the station names "JKA2" to "JKA19". The display of the pictorial symbols and the estimated arrival times is scrolled together with the station names. "G01" is displayed under "JKA1" and a character "minute in Japanese" is also displayed according to the array of the estimated arrival times. However, "JKA1", "G01", and "minute in Japanese" are fixedly displayed and are not scrolled.

The scroll display is explained in association with processing in the display device 30. FIG. 20 is a diagram for explaining the scroll display of route guidance. (a) represents an initial screen, (b) represents a screen during scroll, and (c) represents a screen after the stop of the scroll. A scrolling direction is represented by SC. A fixed section 40 is a region for displaying, for example, route guidance and is, for example, a rectangular region specified by vertexes P1, P3, P6, and P4. A starting station display region 41 is, for example, a rectangular region in the fixed section 40 and is specified by vertexes P1, P2, P5, and P4. A scroll display region 42 is, for example, a rectangular region in the fixed section 40 and is a region specified by vertexes P2, P3, P6, and P5 in which scroll display is performed. Component contents K1 to K19 are respectively parts for displaying station names. The display of "G01" to "G19", "minute in Japanese", and the estimated arrival times can also be explained as component contents. Therefore, explanation thereof is omitted. The upper portion of the guidance screen 1 can be displayed by, for example, processing same as the processing explained in the first to third embodiments. Therefore, details of the upper portion are omitted.

First, the image-creation-instruction-file generating unit 32A receives train information from the train information devices 10 and 11. The train information includes information such as indication that a route is "AA line", station names (stopping station information) from a starting station to a terminal station on the route, and estimated arrival times from the staring station to respective stations. The image-creation-instruction-file generating unit 32A selects, based on the received train information, component contents used in route guidance from the component-content storing unit 31A. Specifically, the image-creation-instruction-file generating unit 32A selects, based on the train information, from the component-content storing unit 31A, component contents K1 to K19 for displaying station names of stations of the "AA line" from the starting station "JKA1" to the terminal station "JKA19". The estimated arrival times from the starting station can be displayed under the station names as shown in FIG. 19 by using the estimated arrival times included in the train information.

Subsequently, the image-creation-instruction-file generating unit 32A refers to the component arrangement definition data stored in the component-arrangement-definition-data storing unit 31B. The component arrangement definition data defines component contents used for forming the guidance screen 1 and gives initial arrangement information of the component contents on the guidance screen 1. The image-creation-instruction-file generating unit 32A can acquire initial arrangement information of component contents K1 to K19 on the guidance screen 1 by referring to the component arrangement definition data.

Figure 21:
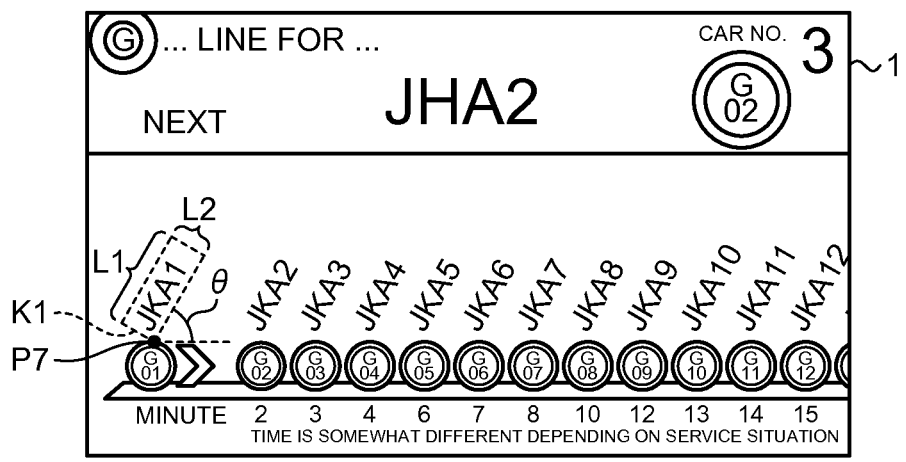
FIG. 21 is a diagram for explaining initial arrangement of a component content K1.

Initial arrangement of the component contents K1 to K19 is, for example, as explained below. First, a two dimensional coordinate system (e.g., an XY coordinate system) is set on an imaginary plane including the guidance screen 1 and positions on the guidance screen 1 are indicated by XY coordinate values. For example, the fixed section 40 is a fixed region specified by coordinate values of the vertexes P1, P3, P6, and P4. Similarly, the starting station display region 41 is specified by coordinate values of the vertexes P1, P2, P5, and P4 and the scroll display region 42 is specified by coordinate values of the vertexes P2, P3, P6, and P5. The component content K1 forms, for example, a rectangular display region on the guidance screen 1. Therefore, a coordinate value of one vertex of the rectangular display region (e.g., a coordinate value of a point P7 in FIG. 21), the lengths of two sides of the rectangular display region (e.g., the length of L1 and L2 in FIG. 21), and an inclination angle of one side of the rectangular display region with respect to the horizontal direction (e.g., an angle θ in FIG. 21) are given, whereby an initial arrangement position on the guidance screen 1 is given. The initial arrangement position of the component content K1 is within the starting station display region 41. Initial arrangement positions of the component contents K2 to K19 are given in the same manner as the initial arrangement position of the component content K1. Specifically, the component contents K2 to K19 are arrayed, for example, at an equal interval in order from the left to the right. However, as shown in FIG. 20(a), although the component contents K2 to K12 are initially arranged within the guidance screen 1 (specifically, within the scroll display region 42), the component contents K13 to K19 are initially arranged outside the guidance screen 1. More specifically, although most of the component content K12 is initially arranged within the scroll display region 42, only a part of the component content K12 is initially arranged outside the guidance screen 1. Although most of the component content K13 is initially arranged outside the guidance screen 1, only a part of the component content K13 is initially arranged within the scroll display region 42. The arrangement of the component contents is defined on the imaginary plane including the outside of the guidance screen 1 because the arrangement is convenient for representing motions of the component contents. It goes without saying that, when all or a part of the component contents are arranged outside the guidance screen 1, the portions arranged outside the guidance screen 1 are not actually displayed. That is, portions actually displayed on the guidance screen 1 are only portions of the component contents on the guidance screen 1.

Further, the image-creation-instruction-file generating unit 32A refers to the component motion definition data stored in the component-motion-definition-data storing unit 31C. The component motion definition data specifies motions of the component contents K1 to K19 on the guidance screen 1. The image-creation-instruction-file generating unit 32A can acquire motion information of the component contents K1 to K19 on the guidance screen by referring to the component motion definition data.

The motions of the component contents K1 to K19 specified by the component motion definition data are, for example, as explained below. When scroll start time (a display state shown in FIG. 20(*a*)) is set to time 0 second, a display state shown in FIG. 20(*b*) is set to time T2 seconds, and scroll end time is set to time T3 seconds (a display state shown in FIG. 20(*c*)), the component content K1 is fixedly displayed in the initial arrangement position throughout time 0 to time T3 and, therefore, does not move. On the other hand, the component contents K2 to K19 are specified to linearly move along the scroll direction SC at time 0 to time T3 and not to be displayed outside the scroll display region 42 even if the component contents K2 to K19 are present within the guidance screen 1 (e.g., a degree of transparence only has to be described to be set to 100%). The operations explained above concerning the component contents K2 to K19 are described in the component motion definition data. Further, if explained individually, for example, the motion of the component content K2 ("JKA2") is specified such that the component content K2 is initially arranged at the left end within the scroll display region 42 at time 0 (FIG. 20(*a*)), imaginarily reaches the starting station display region 41 at time T2 (not shown in the figure), and imaginarily reach the outside of the guidance screen 1 at time T3 (FIG. 20(*c*)). For example, the motion of the component content K11 ("JKA11") is specified such that the component content K11 is arranged at the right end within the scroll display region 42 at time 0 (FIG. 20(*a*)), reaches substantially the middle within the scroll display region 42 at time T2 (FIG. 20(*b*)), and reaches the left end within the scroll display region 42 at time T3 (FIG. 20(*c*)). Further, for example, the motion of the component content K19 ("JKA19") is specified such that the component content K19 is imaginarily arranged outside the guidance screen 1 at time 0 (FIG. 20(*a*)), imaginarily arranged outside the guidance screen 1 at time T2 as well, and reaches the right end within the scroll display region 42 at time T3 (FIG. 20(*c*)).

Subsequently, the image-creation-instruction-file generating unit 32A creates, based on the initial arrangement information and the motion information of the component contents K1 to K19, the initial file 6A in which creation instruction contents for creating a first frame are described. Further, the image-creation-instruction-file generating unit 32A creates, based on the motion information, a plurality of, for example, the difference files 6B in which creation instruction contents for all the remaining frames following the first frame are individually described. To smoothly perform the scroll display shown in FIG. 20 to allow passengers to feel as if the passengers see an animation moving image, for example, the frames are displayed, for example, at the number of frames of about N=30 to 60 in one second. Therefore, the image-creation-instruction-file generating unit 32A sequentially generates T3×N screen creation instruction files corresponding to a total number of frames displayed in T3 seconds.

Subsequently, the image-file generating unit 32B creates an image file based on the initial file 6A and displays the first frame on the display unit 33 according to the image file (FIG. 9(*a*)). Further, the image-file generating unit 32B sequentially creates image files based on the initial file 6A and the difference files 6B and sequentially displays second and subsequent frames on the display unit 33 according to the image files (FIGS. 9(*b*) and 9(*c*)). After display of route guidance, the image-file generating unit 32B can erase the image files. Details of the processing explained above are as explained in the first embodiment. As a result, display control is performed such that, within the scroll display region 42, the linearly-arrayed station names move little by little in the scroll direction SC and is smoothly scroll-displayed and none of the component contents K2 to K19 are displayed outside the scroll display region 42. The same holds true concerning display of "G02" to "G19" and the estimated arrival times.

Figure 22:
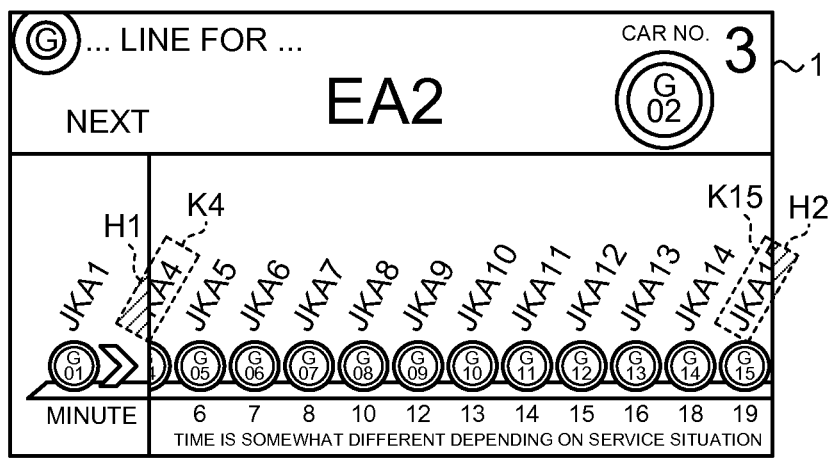
FIG. 22 is a diagram for explaining image trimming by an image-file generating unit.

In FIG. 22, a portion of the component content K4 located outside the scroll display region 42 is indicated by H1 (a hatched portion) and a portion of the component content K15 located outside the scroll display region 42 is indicated by H2 (a hatched portion). It is indicated that the portion H1 of the component content K4 and the portion H2 of the component content K15 are not actually displayed. The image-file generating unit 32B includes an image trimming section for trimming, in creating a frame shown in FIG. 22, places corresponding to H1 and H2 respectively from the component contents K4 and K15. The image-file generating unit 32B creates an image file by arranging, on the guidance screen 1, parts obtained by excluding the places corresponding to H1 and H2 using the image trimming section. That is, concerning the component contents K2 to K19, portions outside the scroll display region 42 are not imaged and only portions within the scroll display region 42 are imaged.

Figure 23:
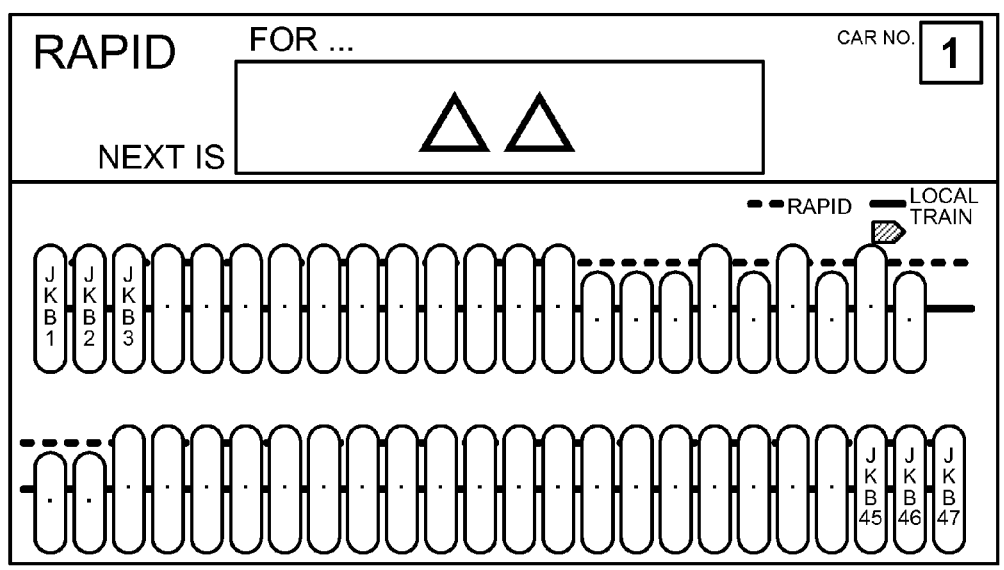
FIG. 23 is a diagram of an example of route guidance in the past.

As explained above, according to the route guidance, all the station names on the route are not simultaneously displayed in one screen (however, all the station names can be displayed in one screen) and all the station names on the route are smoothly displayed like a (animation) moving image while the array of the station names is scrolled. Therefore, by adjusting the number of station names displayed at a time, it is possible to set a character size large, display all the station names by scrolling, and further improve visibility. FIG. 23 is a diagram of an example of route guidance in the past. In FIG. 23, all station names on a route are displayed as a still image in one screen. "AA" represents a destination, "JKB1" to "JKB47" represent the station names on the route, and a part of the station names are not written.

In the route guide in this embodiment, the station names ("JKA1", "JKA2", etc.) are written to incline at a predetermined angle from the horizontal direction. Consequently, it is possible to simultaneously display as many station names as possible in an array direction while securing visibility.

In the route guide, the station name "JKA2" and the subsequent station names are scrolled in a state in which the display of "JKA1" of the staring station is fixed. However, all the stopping stations including "JKA1" can be scrolled. Further, an arbitrary part of the station names among all the station names can be scrolled. In the route guide, the scroll direction SC is set in, for example, the horizontal direction. However, the scroll direction SC can be set in other directions, for example, the vertical direction.

In the route guide, the component contents K2 to K19 for respectively displaying the station names on the route are separately arranged and moved. The component contents K2 to K19 display a station name array in which a plurality of station names are arrayed in order of arrival. However, the component contents K2 to K19 can be treated as a single component content. The same display can be performed by moving the single component content.

Figure 24:
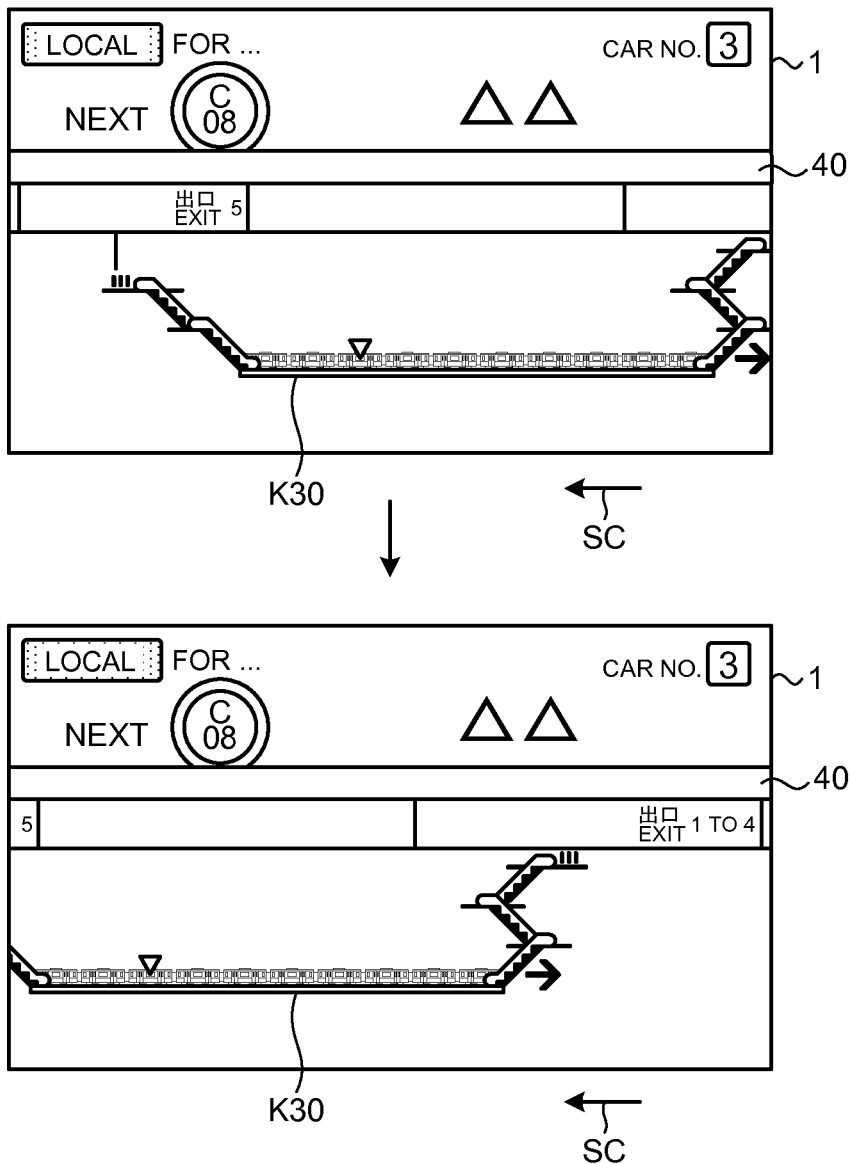
FIG. 24 is a diagram of a display example of facility guidance in a platform of a station according to the fourth embodiment.

FIG. 24 is a diagram of a display example of facility guidance in a platform of a station according to this embodiment. The facility guidance is, for example, facility guidance in a platform of the next stopping station. Display contents of the guidance screen 1 are scrolled in the left direction on the screen as indicated by an arrow. Display contents in the upper part of the guidance screen 1 are the same as, for example, the display contents shown in FIG. 19. Therefore, display contents of the fixed section 40 in the lower part of the guidance screen 1 are explained. "AA" represents a destination and "BB" represents the next stopping station name.

Figure 25:
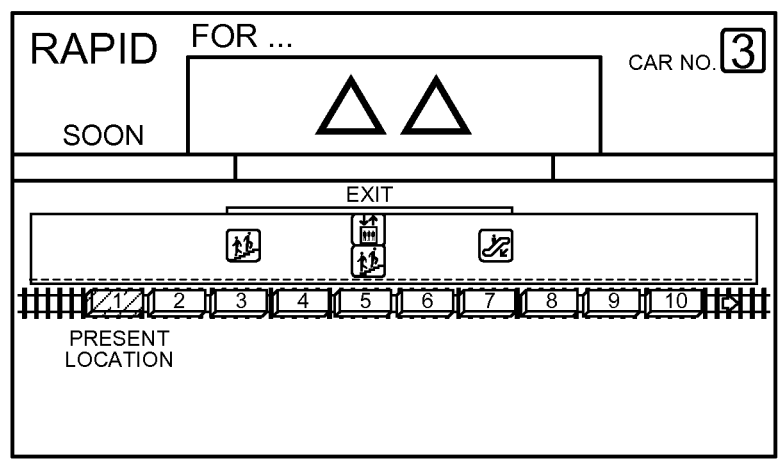
FIG. 25 is a diagram of an example of facility guidance in a platform in the past.
Figure 26:
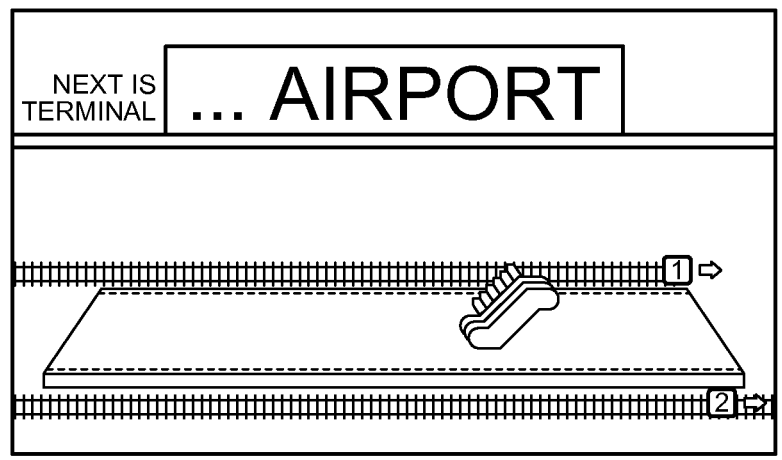
FIG. 26 is a diagram of an example of facility guidance of an entire station in the past.
Figure 27:
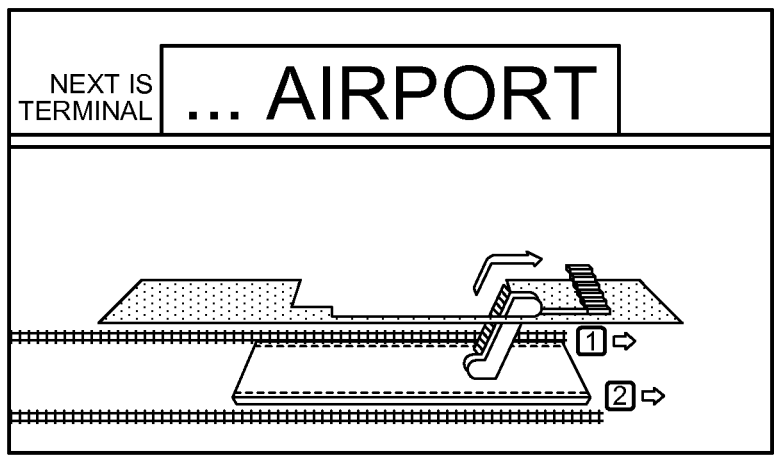
FIG. 27 is a diagram of an example of the facility guidance of the entire station in the past.
Figure 28:
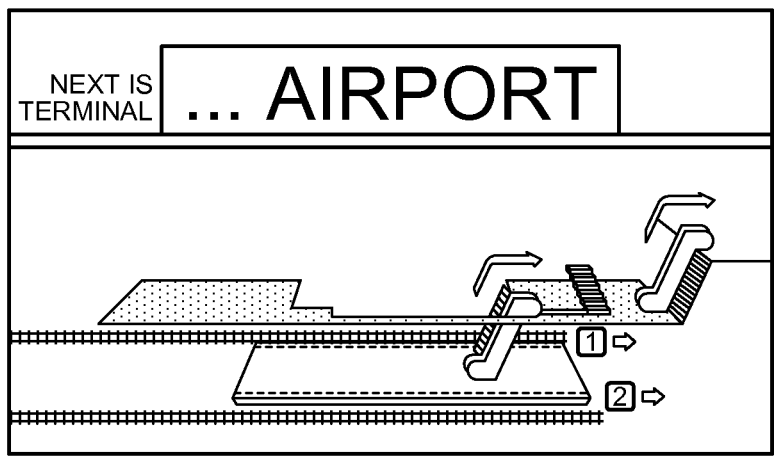
FIG. 28 is a diagram of an example of the facility guidance of the entire station in the past.
Figure 29:
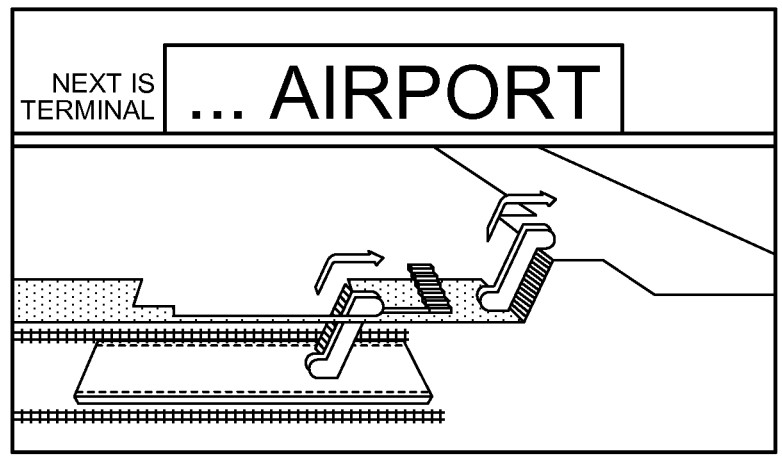
FIG. 29 is a diagram of an example of the facility guidance of the entire station in the past.
Figure 30:
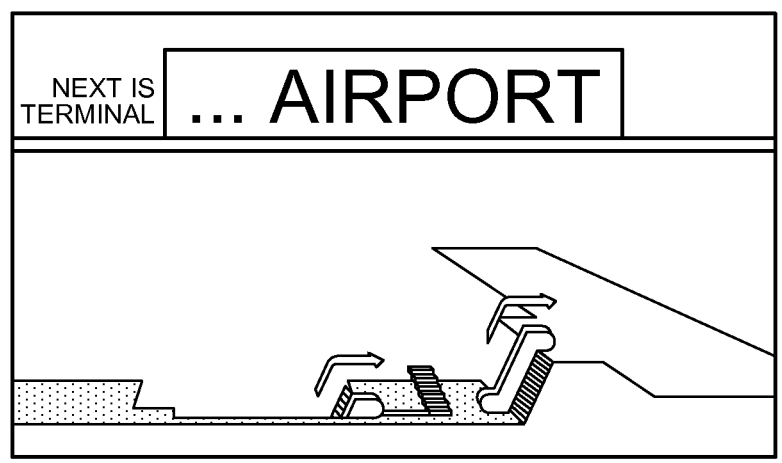
FIG. 30 is a diagram of an example of the facility guidance of the entire station in the past.

As shown in FIG. 24, in the fixed section 40, a component content K30 is moved in the scroll direction SC, for example, the horizontal direction to perform the facility guidance in the platform of the station. The component content K30 is a part including display of a sectional configuration of at least the platform and facilities in the platform (e.g., stairs, an escalator, and an elevator connected to the platform, a kiosk, a vending machine, and a lavatory and the like). Further, the component content K30 can include display of a platform stop position (indicated by a reverse triangle) of a car mounted with the display device 30, transfer guidance, exit guidance, and the like. In this example, the fixed section 40 is a scroll display region. The component content K30 is set to a size for allowing the entire component content K30 to be displayed by scrolling. That is, a display range in the scroll direction SC of the component content K30 is set larger than the width in the scroll direction SC of the fixed section 40 to enlarge the display of the facility guidance and secure visibility. The component content K30 is scrolled from a state in which the platform and a part on one end side of the platform among all the facilities in the platform are arranged and displayed to a state in which the platform and only a part on the other end side of the platform among all the facilities in the platform are arranged and displayed. FIG. 25 is a diagram of an example of facility guidance in a platform in the past. In FIG. 25, the entire platform is displayed in one screen as a still image. A positional relation between the platform and stairs and the like is displayed using a pictogram.

As explained above, in the facility guidance in this embodiment, the entire component content K30 representing the sectional configuration of the platform and the facilities in the platform is not simultaneously displayed in one screen. The entire component content K30 is displayed while being scrolled in one direction from one end to the other end in the scroll display region. Therefore, it is possible to display the entire configuration of the platform and the facilities in the platform without deteriorating visibility. Processing in the display device 30 in scroll-displaying the facility guidance can be explained the same as the route guidance. Therefore, details of the processing are omitted. For example, the screen creating unit 32 can specify the next stopping station based on stopping station information provided as the train information and select the component content K30 from the component-content storing unit 31A.

Besides the route guidance and the facility guidance in the platform, various kinds of guidance can be displayed in the scroll display region of the fixed section 40. For example, facility guidance for the entire station can be scroll-displayed. For example, in the case of an airport station, facilities of the entire station from a platform to a check-in counter can be smoothly scroll-displayed. On the other hand, for example, as shown in FIGS. 26 to 30, in the past, guidance of the entire station is carried out by switching a screen of a still image. That is, in the past, still images shown in FIGS. 26 to 30 are displayed in order.

As explained above, according to this embodiment, by performing the scroll display, it is possible to display a lot of information without reducing a character seize and a pictorial size. Further, according to this embodiment, because the guidance screen is formed using the component contents, it is possible to display a lot of information without increasing a data amount. Component contents to be subjected to the scroll display are not limited to the example explained above.

Fifth Embodiment.

In a fifth embodiment, a specific display example of guidance contents by a video information distributing and displaying system is explained. Configurations and the like of the video information distributing and displaying system according to this embodiment are the same as those in the first to third embodiments.

FIG. 31 is a diagram for explaining a motion of shaking guidance according to this embodiment. (a) is a diagram during passage of a point Q2 by a train 60, (b) is a diagram during passage of a point Q3 by the train 60 after the passage of the point Q2. The shaking guidance is guidance for calling attention of passengers concerning passage of a shaking point during traveling of the train 60. The shaking point is, for example, a railway point or a sharp curve. In FIG. 31, a relation among the train 60, railroads R1 and R2, a shaking point Q1, and the like is schematically shown. Specifically, the railroad R1 and the railroad R2 branching from the railroad R1 are displayed. A branch point Q1 of the railroads R1 and R2 indicates a "shaking point". An arrow pointing the "shaking point" is displayed together with writing of the "shaking point" indicating that the branch point Q1 is the "shaking point". In the figure, a state in which the train 60 traveling on the railroad R1 is traveling toward the shaking point Q1 is shown.

The display device 30 can start the shaking guide when the distance between a traveling location of the train 60 and the "shaking point" decreases to be equal to or smaller than a predetermined distance. Distance determination by the screen creating unit 32 is performed, for example, as explained below. First, the train information devices 10 and 11 have, for example, kilometrage information from a starting station of the train 60 as train traveling location information. Because the "shaking point" is known in advance from route information, kilometrage information of the "shaking point" is given to the train information devices 10 and 11 in advance. In this way, the display device 30 can acquire the kilometrage information of the train 60 and the kilometrage information of the "shaking point" from the train information devices 10 and 11, calculates the distance from the traveling location of the train 60 to the "shaking point" as a difference, and can determine timing for starting the shaking guidance by comparing the calculated distance to the "shaking point" with the predetermined distance.

The shaking guidance is displayed to interrupt guidance displayed so far when the train 60 approaches the "shaking point" (interrupt guidance). Timing of the interrupt is time when the distance between the traveling location of the train 60 and the "shaking point" decreases to be equal to or smaller than the predetermined distance. For example, the display device 30 can expand or reduce a display region for the shaking guidance or move the position of the display region in the guidance screen 1 according to kilometrage. That is, the screen creating unit 32 can also control timing of scroll display, expansion, reduction, or movement according to the kilometrage of the train 60. Details of processing by the screen creating unit 32 is the same as the processing explained in the first to third embodiments, the processing in the scroll display explained in the fourth embodiment, and the like. That is, the screen creating unit 32 selects component contents used for forming a shaking guidance content from the component-content storing unit 31A, arranges the selected component contents on the guidance screen 1 according to the component arrangement definition data, moves the arranged component contents on the guidance screen 1 little by little according to the component motion definition data to thereby create a plurality of frames continuous in time series, and displays the frames on the display unit 33. The component contents used for forming the shaking guidance content are, for example, component contents for displaying indication that the train 60 passes the "shaking point".

FIG. 32 is a diagram of an example in which control such as expansion and reduction for the shaking guidance is performed according to kilometrage. In FIG. 32, A display form of the guidance screen 1 at the point Q2 in FIG. 31, a display form of the guidance screen 1 at the point Q3 in FIG. 31, and a display form of the guidance screen 1 at the point Q1 in FIG. 31 are shown in order. The point Q2 is a point where the display device 30 starts the shaking guidance. The shaking guidance is started in, for example, a display region A1. Guidance displayed so far is reduced and displayed, for example, like display regions A2 and A3. Display contents of the display regions A2 and A3 are arbitrary. For example, the scroll display explained in the fourth embodiment can be performed. The point Q3 is a point between the point Q2 and the point Q1, which is the "shaking point". At the point Q3, the shaking guidance is displayed in the display region A1. Compared with the display region A1 at the point Q2, the display region A1 in this case is reduced. A display position of the display region A1 is moved from, for example, an upper part to lower left of the guidance screen 1. Further, immediately before the train 60 reaches the point Q1, as in the display at the point Q1, the display region A1 is expanded again and the display position of the display region A1 is moved from the lower left to the upper part of the guidance screen 1. A change from the display form at the point Q2 to the display form at the point Q3 can be displayed as a video involving a continuous change by defining, in the component motion definition data, the motions such as expansion, reduction, and movement explained in the first embodiment. The same holds true concerning a change from the display form at the point Q3 to the display form at the point Q1.

In the display region A1, immediately before the train 60 passes the "shaking point", for example, "we will soon pass a shaking point" can be displayed to call attention of passengers. Further, the distance or time to the "shaking point" such as "AA m to a shaking point" or "A minutes and B seconds to a shaking point" can be displayed from a traveling location and traveling speed of the train 60. In the former, the display device 30 can determine timing of the display based on the kilometrage of the train 60. In the latter, the display device 30 only has to display a difference between the kilometrage of the train 60 and the kilometrage of the "shaking point" or time calculated from the difference and the present traveling speed.

By performing the display control as shown in FIG. 32, for example, first, attention of passengers is called when the shaking guidance is started first and, thereafter, because there is a period of time until the train 60 reaches the "shaking point", the display region A1 is once reduced, and the display region A1 is expanded and displayed again immediately before the "shaking point" to highlight contents according to kilometrage. Consequently, it is possible to perform more effective guidance.

Sixth Embodiment.

In this embodiment, a specific display example of guidance contents by a video information distributing and displaying system is explained. Configurations and the like of the video information distributing and displaying system according to this embodiment are the same as those in the first to third embodiments.

Sudden stop guidance is guidance for starting display after a train actuates a quick brake. However, passengers need to beware of "swing-back" that occurs when the train 60 stops simultaneously with the actuation of the quick brake. Therefore, after the quick brake is actuated, it is desirable to call attention of the passengers by displaying indication that the passengers should beware of the occurrence of the "swing-back" on the guidance screen 1.

FIG. 33 is a diagram for explaining the sudden stop guidance according to this embodiment. (a) is a graph in which a point (or kilometrage) on a route is plotted on the abscissa and the speed of a train is plotted on the ordinate to show a speed change up to a "stop point" after the train actuates the quick brake. When the train stops at the "stop point", "sing back" sometimes occurs backward in a traveling direction.

When the screen creating unit 32 acquires quick brake actuation information from the train information devices 10 and 11, the screen creating unit 32 selects, from the component-content storing unit 31A, component contents (not shown in the figure) for displaying indication that the passengers should beware of swing-back. After initially arranging the component contents on the guidance screen 1 according to the component arrangement definition data, the screen creating unit 32 move the component contents according to the component motion definition data. Consequently, the screen creating unit 32 can perform display guidance for indicating that the passengers should beware of "swing-back". The screen creating unit 32 acquires speed information of the train from the train information devices 10 and 11 and, after the quick brake actuation, monitors whether the speed of the train reaches speed equal to or lower than predetermined speed. When it is determined that the speed reaches speed equal to or lower than the predetermined speed, the speed is close to zero. Therefore, the screen creating unit 32 can determine that "swing-back" is likely to occur and start the guidance using the component contents (not shown in the figure) for displaying the indication that the passengers should beware of occurrence of "swing-back". The train information devices 10 and 11 can manage the quick brake actuation information and the speed information of the train as train information.

After the quick brake actuation, the screen creating unit 32 can change display contents on the guidance screen 1 according to the speed of the train. In changing the display contents, the screen creating unit 32 acquires speed information of the train from the train information devices 10 and 11 and performs display control. For example, in FIG. 33(b), a display form of the guidance screen 1 at a quick brake actuation point is shown on the left side and a display form of the guidance screen 1 at the "stop point" is shown on the right side. Specifically, at the quick brake actuation point, the display region A1 is set as a region larger than the display regions A2 and A3. The display region A1 is arranged in the upper part of the guidance screen 1 and the display regions A2 and A3 are respectively arranged in lower parts of the guidance screen 1. In the display regions A1, A2, and A3, displays different from one another are respectively performed using component contents. On the other hand, at the "stop point", the display region A2 is set as a region larger than the display regions A1 and A3. The display region A2 is arranged in the upper part of the guidance screen 1 and the display regions A1 and A3 are respectively arranged in the lower parts of the guidance screen 1. For example, if "a quick brake is actuated" is displayed in the display region A1 and "please beware of swing-back" is displayed in the second region A2, display contents of the display region A1 is highlighted during the quick brake actuation and display contents of the display region A2 is highlighted at the "stop point". Therefore, it is possible to more effectively transmit more necessary information to the passengers. In the display region A3, for example, the scroll display explained in the fourth embodiment can be performed. Deceleration (a fixed value) is determined in a car of the train. If speed at the time when the quick brake is actuated is known, the "stop point" can be calculated. The screen creating unit 32 can calculate the "stop point" by acquiring speed information of the train at the time of the quick brake actuation from the train information devices 10 and 11.

The motions such as expansion, reduction, and movement of the component contents forming the display regions A1 and A2 can be displayed as a video involving a continuous change by defining the motions in the component motion definition data as explained in the first embodiment.

It goes without saying that the fourth embodiment and one or both of the fifth and sixth embodiments can be combined. For example, after the scroll guidance of the station names and the like shown in FIG. 19 is performed, the shaking guidance shown in FIG. 31 can be started. Alternatively, in FIG. 32, the shaking guidance can be performed in the display region A1 and the scroll guidance of the station names and the like shown in FIG. 19 can be performed in the display region A2. Further, it goes without saying that a combination of the second to sixth embodiments is also possible.

Seventh Embodiment.

Figure 34:
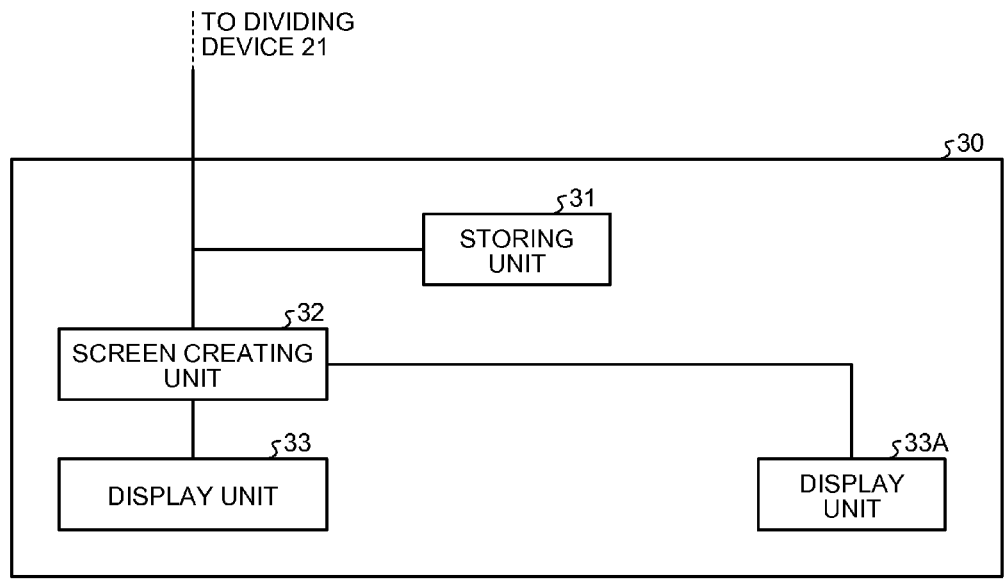
FIG. 34 is a block diagram of the configuration of a display device in a seventh embodiment.

FIG. 34 is a block diagram of the configuration of a display device in a seventh embodiment. As shown in FIG. 34, in this embodiment, the display device 30 includes a display unit 33A (a second display unit) in addition to the display unit 33 (a first display unit). In the first to sixth embodiments, one display unit displays guidance contents and the like under the display control by the screen creating unit 32. However, in this embodiment, two or more display units are connected to the screen creating unit 32. The other components in FIG. 34 are the same as those in the first embodiment. Therefore, the same components are denoted by the same reference numerals and detailed explanation of the components is omitted.

The display units 33 and 33A respectively represent display devices such as liquid crystal display devices. In FIG. 34, both the display units 33 and 33A are shown as being configured to be incorporated in the same device. However, for example, the display unit 33A can be provided in a housing separated from the display unit 33 and the screen creating unit 32 and the display unit 33A can be configured to be connected by a transmission line. That is, both the display units 33 and 33A can be regarded as components of the display device 30 because the display units 33 and 33A display videos under the display control by the same screen creating unit 32. However, as a hardware configuration, the display units 33 and 33A can be separated and individually provided or both the display units 33 and 33A can be provided to be incorporated in the same device.

The screen creating unit 32 has component arrangement definition data (first component arrangement definition data) and component motion definition data (first component motion definition data) for the display unit 33 and has component arrangement definition data (second component arrangement definition data) and component motion definition data (second component motion definition data) for the display unit 33A. As in the first embodiment, the screen creating unit 32 combines component contents to create guidance contents displayed on the display unit 33 according to the component arrangement definition data and the component motion definition data for the display unit 33. As in the first embodiment, the screen creating unit 32 combines component contents to create guidance contents displayed on the display unit 33A according to the component arrangement definition data and the component motion definition data for the display unit 33A.

The guidance contents created for the display unit 33 and the guidance contents created for the display unit 33A are respectively determined according to contents of the component arrangement definition data and the component motion definition data for the display unit 33 and the component arrangement definition data and the component motion definition data for the display unit 33A. For example, if the same component arrangement definition data and the same component motion definition data are applied to both the display units 33 and 33A, the display units 33 and 33A display the same guidance contents.

In the following explanation, the contents of the component arrangement definition data and the component motion definition data for the display unit 33 and the component arrangement definition data and the component motion definition data for the display unit 33A are coordinated in association with each other, whereby the guidance contents created for the display unit 33 and the guidance contents created for the display unit 33A realize displays coordinated with each other.

Figure 35:
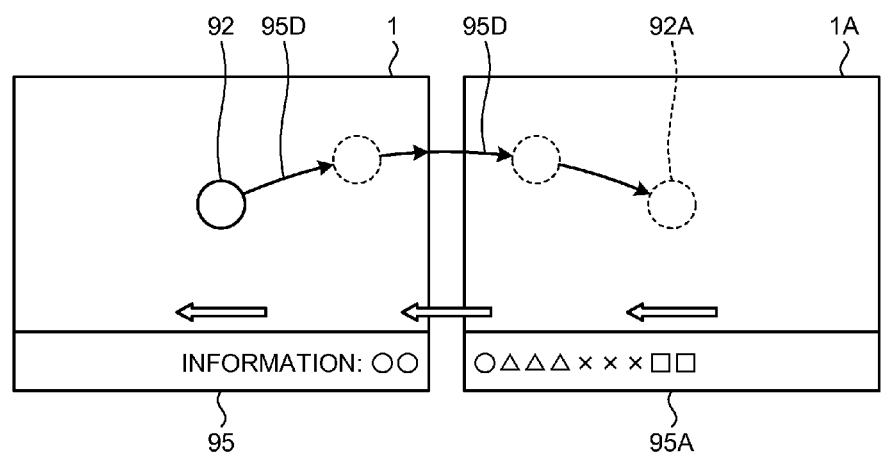
FIG. 35 is a diagram for explaining an example of display control according to the seventh embodiment.

FIG. 35 is a diagram for explaining an example of display control according to this embodiment. In FIG. 35, the guidance screen 1 of the display unit 33 and a guidance screen 1A of the display unit 33A are arranged side by side adjacent to each other in, for example, the horizontal direction. In this case, a space in which a video is not displayed is present between the guidance screen 1 and the guidance screen 1A. The width of the space depends on the hardware configuration of the display units 33 and 33A. Therefore, depending on a configuration, the width can be set as close as possible to 0. The display units 33 and 33A can also be provided adjacent to, for example, interior wall surfaces of lintel portions above doors or near baggage racks in a car. In the explanation in this embodiment, for example, two display units are provided. However, the same explanation applies when three or more display units are provided.

In the guidance screen 1, a component content 92 (a first component content) is displayed, for example, substantially in the center of a display region. The component content 92 moves on the guidance screen 1 according to a track 95D. After reaching the right end of the guidance screen 1, the component content 92 disappears from the guidance screen 1 to move to the outside of the guidance screen 1. Subsequently, for example, a component content 92A (a second component content) having the same shape as the component content 92 appears on the guidance screen 1A from the left end of the guidance screen 1A. The component content 92A moves on the guidance screen 1A according to the track 95D. The track 95D is a track extending across the guidance screens 1 and 1A. That is, the motion of the component content 92 on the guidance screen 1 and the motion of the component content 92A on the guidance screen 1A are coordinated as if the guidance screens 1 and 1A are one screen. For example, when the component contents 92 and 92A are component contents representing a "ball", the "ball" thrown from a predetermined place on the guidance screen 1 moves onto the guidance screen 1A crossing over the space between the display units 33 and 33A.

The coordination of the motion of the component content 92 on the guidance screen 1 and the motion of the component content 92A on the guidance screen 1A is realized by the screen creating unit 32 by specifying the contents of the component arrangement definition data and the component motion definition data for the display screen 33 and the component arrangement definition data and the component motion definition data for the display screen 33A to realize the coordinated motion. For example, concerning the component content 92, the component arrangement definition data and the component motion definition data for the display screen 33 are specified such that the component content 92 moves on the guidance screen 1 according to the track 95D from time t0 to time t1. Concerning the component content 92A, the component arrangement definition data and the component motion definition data for the display screen 33A are specified to move on the guidance screen 1A according to the track 95D from time t2 to time t3. Further, time t1 and time t2 are set in a relation t2>t1.

The telop display explained in the second embodiment is performed on the lower sides in the guidance screens 1 and 1A. In this case, display contents of the telop display are scrolled across the guidance screens 1 and 1A along a direction of an arrow. That is, in a part 95 on the guidance screen 1 and a part 95A on the guidance screen 1A, component contents for displaying "information: AAABBBCCCDD" move in the direction of the arrow in coordinate with one another, whereby scroll display extending over the guidance screen 1 and 1A is realized. Specifically, the motion of component contents (first component contents) for displaying "information: AAABBBCCCDD" move on the guidance screen 1 and the motion of component contents (second component contents) for displaying "information: AAABBBCCCDD" moved on the guidance screen 1A only have to be coordinated such that the display of "information: AAABBBCCCDD" is scrolled across the guidance screens 1 and 1A. Details of the coordinated motion are evident from the second and fourth embodiments and a combination of the coordinated motions of the component contents 92 and 92A.

According to this embodiment, both the display units 33 and 33A can be used like one wide screen. Therefore, an amount of information provided by this wide screen display can be increased and expressiveness is also improved. In this case, the display units 33 and 33A can be provided adjacent to, for example, interior wall surfaces of lintel portions above doors or near baggage racks in a car. In the example explained above, the display units 33 and 33A are arranged side by side, for example, in the horizontal direction. However, it is also possible to arrange the display units 33 and 33A, for example, in the up down direction and realize coordination of display contents of the display units 33 and 33A in the same manner as explained above.

INDUSTRIAL APPLICABILITY

As explained above, the present invention is useful as a video information distributing and displaying system and a video information distributing and displaying method that can increase an amount of information provided to passengers and substantially reduce a data storage capacity.

REFERENCE SIGNS LIST 1 guidance screen
6 screen creation instruction file
6A initial file
6B difference file
8 image file
10, 11 train information devices
12 transmission line
20 video information distributing device
21 dividing devices
22 transmission line
30 display devices
31 storing unit
31A component-content storing unit
31B component-arrangement-definition-data storing unit
31C component-motion-definition-data storing unit
31D guidance-display-order-data storing unit
32 screen creating unit
32A screen-creation-instruction-file generating unit
32B image-file generating unit
33 display unit
50 radio transmission and reception device
51 ground station
60 train
70 on-board system
80 part
101 train type
102 destination
103 car number
104 guidance type
105 station name
110 component content
110A component content
110B component content
120 component content
125 component content

The invention claimed is:
1. A video information distributing and displaying system comprising:
   train information devices respectively mounted on cars included in a train and configured to manage train information in association with one another;
   display devices respectively mounted on the cars and including display units configured to display a guidance screen;

a component-content storing unit configured to store component contents, which are contents at a component level, used for forming the guidance screen;

a component-arrangement-definition-data storing unit configured to store component arrangement definition data for defining arrangement of the component contents on the guidance screen;

a component-motion-definition-data storing unit configured to store component motion definition data for individually defining motions of the component contents themselves on the guidance screen; and a screen creating unit configured to:
  select, according to guidance contents displayed on the guidance screen, based on the train information obtained from the train information devices, the component contents, which are used for forming the guidance screen, from the component-content storing unit;
  arrange the selected component contents on the guidance screen according to the component arrangement definition data;
  move the arranged component contents on the guidance screen little by little according to the component motion definition data to create a plurality of frames that are consecutive in time series; and
  display the plurality of frames in time series on the display units, wherein the train information includes station information, wherein the screen creating unit selects, from the component-content storing unit, a component content indicating a station name array in which names of a plurality of stations on a route of the train are arrayed in an order of arrival, and creates the plurality of frames such that the names of the plurality of stations are smoothly scrolled in an array direction on the guidance screen, wherein in the first frame of the plurality of frames, names of a part of the plurality of stations on a side of a starting station are arranged and displayed, and wherein in the last frame of the plurality of frames, names of another part of the plurality of stations on a side of a terminal station are arranged and displayed.

2. The video information distributing and displaying system according to claim 1,
  wherein the screen creating unit further selects another component content indicating a name of the starting station and arranges said another component content in a fixed manner,
  wherein the plurality of stations include from a next station next to the starting station to the terminal station in the order of arrival,
  wherein in the first frame of the plurality of frames, names of the starting station and a part of the plurality of stations including the next station and not including the terminal station are arranged and displayed, and
  wherein in the last frame of the plurality of frames, names of the starting station and another part of the plurality of stations including the terminal station are arranged and displayed.

3. The video information distributing and displaying system according to claim 2, wherein the array direction is a horizontal direction.

4. The video information distributing and displaying system according to claim 3, wherein a name of each of the plurality of stations is displayed so that it is inclined at a predetermined angle from the horizontal direction.

5. The video information distributing and displaying system according to claim 4, wherein the component content indicating the station name array includes a plurality of component contents for respectively displaying station names of the plurality of stations.

6. The video information distributing and displaying system according to claim 1, wherein
  the display device includes a first display unit and a second display unit arranged side by side adjacent to the first display unit,
  the component-arrangement-definition-data storing unit stores first component arrangement definition data for defining arrangement of a first component content on a guidance screen of the first display unit and second component arrangement definition data for defining arrangement of a second component content on a guidance screen of the second display unit,
  the component-motion-definition-data storing unit stores first component motion definition data for defining a motion of the first component content on the guidance screen of the first display unit and second component motion definition data for defining a motion of the second component content on the guidance screen of the second display unit coordinated with the action of the first component content, and
  the screen creating unit moves, according to the first component arrangement definition data and the first component motion definition data, the first component content on the guidance screen of the first display unit to thereby perform display on the first display unit and moves, according to the second component arrangement definition data and the second component motion definition data, the second component content on the guidance screen of the second display unit to thereby perform display on the second display unit.

7. The video information distributing and displaying system according to claim 6, wherein
  the first component content and the second component content represent same display contents, and
  the first and second component motion definition data specify motions of the first and second component contents such that the first component content moves toward the second display unit side on the guidance screen of the first display unit and, after the first component content reaches an end of a display screen of the first display unit and disappears from the guidance screen, the second component content sequentially appears from an end on the first display unit side on the guidance screen of the second display unit instead of the first component content, and the second component content moves on the guidance screen of the second display unit.

8. The video information distributing and displaying system according to claim 6, wherein the first and second display units are arranged side by side adjacent to each other in a horizontal direction on an interior wall surface of a lintel portion above a door or near a baggage rack in the car.

9. The video information distributing and displaying system according to claim 1, wherein a number of frames created by the screen creating unit in one second is set to thirty to sixty.

10. The video information distributing and displaying system according to claim 1, wherein, in the component-content storing unit, the component contents are stored as vector data.

11. A video information distributing and displaying system comprising:
- train information devices respectively mounted on cars included in a train and configured to manage train information in association with one another;
- display devices respectively mounted on the cars and including display units configured to display a guidance screen;
- a component-content storing unit configured to store component contents, which are contents at a component level, used for forming the guidance screen;
- a component-arrangement-definition-data storing unit configured to store component arrangement definition data for defining arrangement of the component contents on the guidance screen;
- a component-motion-definition-data storing unit configured to store component motion definition data for individually defining motions of the component contents themselves on the guidance screen; and
- a screen creating unit configured to:
  - select, according to guidance contents displayed on the guidance screen, based on the train information obtained from the train information devices, the component contents, which are used for forming the guidance screen, from the component-content storing unit;
  - arrange the selected component contents on the guidance screen according to the component arrangement definition data;
  - move the arranged component contents on the guidance screen little by little according to the component motion definition data to create a plurality of frames that are consecutive in time series; and
  - display the plurality of frames in time series on the display units,
- wherein the train information includes station information,
- wherein the screen creating unit selects, from the component-content storing unit, a component content indicating a station facility guidance including a configuration of a platform of a next-stopping station and a facility of the platform, and creates the plurality of frames such that the station facility guidance is smoothly scrolled in one direction on the guidance screen,
- wherein in the first frame of the plurality of frames, a part of the configuration including one end of the platform is arranged and displayed, and
- wherein in the last frame of the plurality of frames, another part of the configuration including another end of the platform is arranged and displayed.

12. The video information distributing and displaying system according to claim 11, wherein the one direction is a horizontal direction.

13. The video information distributing and displaying system according to claim 12, wherein the facility of the platform is stairs, an escalator, and an elevator connected to the platform, a kiosk, a vending machine, or a lavatory.

14. A video information distributing and displaying method in a train,
the train comprising:
- train information devices respectively mounted on cars included in the train and configured to manage train information in association with one another,
- display devices respectively mounted on the cars and including display units configured to display a guidance screen,
- a component-content storing unit configured to store component contents, which are contents at a component level, used for forming the guidance screen,
- a component-arrangement-definition-data storing unit configured to store component arrangement definition data for defining arrangement of the component contents on the guidance screen, and
- a component-motion-definition-data storing unit configured to store component motion definition data for individually defining motions of the component contents themselves on the guidance screen, the video information distributing and displaying method comprising:
- a first step in which a screen creating unit of the display device acquires the train information from the train information devices;
- a second step in which the screen creating unit selects, according to guidance contents displayed on the guidance screen, based on the train information, the component contents, which are used for forming the guidance screen, from the component-content storing unit; and
- a third step in which the screen creating unit arranges the selected component contents on the guidance screen according to the component arrangement definition data, moves the arranged component contents on the guidance screen little by little according to the component motion definition data to create a plurality of frames that are consecutive in time series, and displays the plurality of frames in time series on the display units,
- wherein the train information includes station information,
- in the second step, the screen creating unit selects, from the component-content storing unit, a component content indicating a station name array in which names of a plurality of stations on a route of the train are arrayed in an order of arrival, and
- in the third step, the screen creating unit creates the plurality of frames such that the names of the plurality of stations are smoothly scrolled in an array direction on the guidance screen,
- wherein in the first frame of the plurality of frames, names of a part of the plurality of stations on a side of a starting station are arranged and displayed, and
- wherein in the last frame of the plurality of frames, names of another part of the plurality of stations on a side of a terminal station are arranged and displayed.

15. A video information distributing and displaying method in a train,
the train comprising:
- train information devices respectively mounted on cars included in the train and configured to manage train information in association with one another,
- display devices respectively mounted on the cars and including display units configured to display a guidance screen,
- a component-content storing unit configured to store component contents, which are contents at a component level, used for forming the guidance screen,
- a component-arrangement-definition-data storing unit configured to store component arrangement definition data for defining arrangement of the component contents on the guidance screen, and
- a component-motion-definition-data storing unit configured to store component motion definition data for individually defining motions of the component contents themselves on the guidance screen, the video information distributing and displaying method comprising:

a first step in which a screen creating unit of the display device acquires the train information from the train information devices;

a second step in which the screen creating unit selects, according to guidance contents displayed on the guidance screen, based on the train information, the component contents, which are used for forming the guidance screen, from the component-content storing unit; and a third step in which the screen creating unit arranges the selected component contents on the guidance screen according to the component arrangement definition data, moves the arranged component contents on the guidance screen little by little according to the component motion definition data to create a plurality of frames that are consecutive in time series, and displays the plurality of frames in time series on the display units, wherein the train information includes station information, in the second step, the screen creating unit selects, from the component-content storing unit, a component content indicating a station facility guidance including a configuration of a platform of a next-stopping station and a facility of the platform, and in the third step, the screen creating unit creates the plurality of frames such that the station facility guidance is smoothly scrolled in one direction on the guidance screen, wherein in the first frame of the plurality of frames, a part of the configuration including one end of the platform is arranged and displayed, and wherein in the last frame of the plurality of frames, another part of the configuration including another end of the platform is arranged and displayed.

* * * * *